US012620702B2

(12) United States Patent
Chen et al.

(10) Patent No.: US 12,620,702 B2
(45) Date of Patent: May 5, 2026

(54) RECONFIGURABLE ANTENNA AND CONTROL METHOD THEREFOR, AND ROUTER AND SIGNAL TRANSCEIVING DEVICE

(71) Applicant: ZTE CORPORATION, Shenzhen (CN)

(72) Inventors: Jianqiang Chen, Shenzhen (CN); Fei Cao, Shenzhen (CN); Dianping Xu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 325 days.

(21) Appl. No.: 18/683,077

(22) PCT Filed: Jul. 13, 2022

(86) PCT No.: PCT/CN2022/105526
§ 371 (c)(1),
(2) Date: Mar. 13, 2024

(87) PCT Pub. No.: WO2023/016180
PCT Pub. Date: Feb. 16, 2023

(65) Prior Publication Data

US 2024/0380108 A1 Nov. 14, 2024

(30) Foreign Application Priority Data

Aug. 13, 2021 (CN) ......................... 202110928285.5

(51) Int. Cl.
*H01Q 3/24* (2006.01)
*H01Q 7/00* (2006.01)

(52) U.S. Cl.
CPC ............... *H01Q 3/24* (2013.01); *H01Q 7/005* (2013.01)

(58) Field of Classification Search
CPC ........ H01Q 3/24; H01Q 7/005; H01Q 1/2291; H01Q 1/48; H01Q 1/50; H01Q 3/247;
(Continued)

(56) References Cited

U.S. PATENT DOCUMENTS 8,373,609 B1 * 2/2013 Dorsey ................ H01Q 19/005
343/769
10,038,240 B2 * 7/2018 Patron ...................... H01Q 1/38
(Continued)

FOREIGN PATENT DOCUMENTS

CN 106299724 A 1/2017
CN 106450797 A * 2/2017
(Continued)

OTHER PUBLICATIONS

European Patent Office. Extended European Search Report for EP Application No. 22855163.6, mailed Oct. 25, 2024, pp. 1-7.
(Continued)

*Primary Examiner* — Jason M Crawford
*Assistant Examiner* — Jose A. Miranda Gonzalez
(74) *Attorney, Agent, or Firm* — Vivacqua Crane, PLLC

(57) ABSTRACT

A reconfigurable antenna, a control method therefor, a router, and a signal transceiving device are disclosed. The reconfigurable antenna may include: a horizontal polarization antenna including a patch structure arranged on an upper surface of a first dielectric plate and a first reflector arranged on a lower surface of the first dielectric plate; a vertical polarization antenna arranged below the horizontal polarization antenna and including a third dielectric plate and a fourth dielectric plate which are perpendicular to the first dielectric plate; and an antenna board, including a fifth dielectric plate.

18 Claims, 15 Drawing Sheets

(58) Field of Classification Search
CPC .. H01Q 9/0421; H01Q 9/0442; H01Q 25/002; H01Q 3/242; H01Q 9/40; H01Q 21/205; H01Q 21/24; H01Q 25/001
See application file for complete search history.

(56) References Cited

U.S. PATENT DOCUMENTS

| | | | | |
|---|---|---|---|---|
| 10,797,408 | B1 * | 10/2020 | Boutayeb | H01Q 1/2291 |
| 2005/0237258 | A1 * | 10/2005 | Abramov | H01Q 21/205 343/834 |
| 2007/0195004 | A1 * | 8/2007 | Rebeiz | H01Q 1/3233 343/876 |
| 2013/0215832 | A1 * | 8/2013 | Gao | H01Q 9/26 343/730 |
| 2016/0211580 | A1 | 7/2016 | Hsu | |
| 2017/0033471 | A1 * | 2/2017 | Huang | H01Q 1/2291 |
| 2018/0342807 | A1 * | 11/2018 | Watson | H01Q 9/0421 |
| 2020/0335879 | A1 * | 10/2020 | Boutayeb | H01Q 3/44 |

FOREIGN PATENT DOCUMENTS

| | | | | | |
|---|---|---|---|---|---|
| CN | 110277651 | A | | 9/2019 | |
| CN | 111180874 | A | | 5/2020 | |
| CN | 114267944 | A | | 4/2022 | |
| CN | 108448256 | B | * | 5/2024 | H01Q 13/106 |

OTHER PUBLICATIONS

International Searching Authority. International Search Report and Written Opinion for PCT Application No. PCT/CN2022/105526 and English translation, mailed Sep. 27, 2022, pp. 1-12.

* cited by examiner

RECONFIGURABLE ANTENNA AND CONTROL METHOD THEREFOR, AND ROUTER AND SIGNAL TRANSCEIVING DEVICE

CROSS-REFERENCE TO RELATED APPLICATION

This application is a national stage filing under 35 U.S.C. § 371 of international application number PCT/CN2022/105526, filed Jul. 13, 2022, which claims priority to Chinese patent application No. 202110928285.5, filed Aug. 13, 2021. The contents of these applications are incorporated herein by reference in their entirety.

TECHNICAL FIELD

The present disclosure relates to the technical field of Wireless Local Area Network (WLAN) communication, and more particularly, to a reconfigurable antenna, a control method therefor, a router, and a signal transceiving device.

BACKGROUND

With the ongoing development of IEEE 802.11 suite of standards, a Multi-User Multi-Input Multi-Output (MU-MIMO) technology which has a physical layer rate of up to 10 Gbit/s has been introduced in the latest standards released in recent years, and WLAN systems have higher requirements on the antenna performance. Nowadays, WLAN systems mainly face three problems: 1) Coverage of edge users: most WLAN systems currently use omnidirectional antennas which have low gain, failing to provide satisfactory wireless signal coverage for distant users; 2) Loss caused by obstacles: electromagnetic waves emitted by antennas experience great loss when passing through some complex terrain environments; and 3) Link interference: in areas with high user density, the simultaneous use of multiple users leads to interference between communication links. To address these issues, in some cases, a scheme is to introduce a beam reconfiguration technology to realize power allocation to specific areas by controlling the deflection direction of directional beams, so as to ensure the reliability of communication systems. However, due to the complex layout of these areas and the change of user density, the deployed WLAN needs to have satisfactory environmental adaptability and flexibility, making it difficult to design antenna devices. Currently, most antennas are capable of providing only a limited number of directional beams in a single polarization direction.

SUMMARY

The present disclosure provides a reconfigurable antenna, a control method therefor, a router, and a signal transceiving device.

In accordance with an aspect of the present disclosure, an embodiment provides a reconfigurable antenna, including: a horizontal polarization antenna, including a patch structure arranged on an upper surface of a first dielectric plate and a first reflector arranged on a lower surface of the first dielectric plate, where a plurality of first slots are provided on the first reflector, the first reflector is electrically connected at each of the first slots to a first diode on the upper surface of the first dielectric plate, and the horizontal polarization antenna is controlled to radiate an omnidirectional beam or a plurality of directional beams by controlling on or off of the plurality of first diodes; a vertical polarization antenna, arranged below the horizontal polarization antenna and including a third dielectric plate and a fourth dielectric plate which are perpendicular to the first dielectric plate, where the third dielectric plate and the fourth dielectric plate are snap-fitted along a snap line perpendicular to the first dielectric plate to form a unity; a radiation patch is arranged on a back side of the third dielectric plate at the snap line, and at least one second reflector is arranged on each of two sides of the radiation patch; at least one second reflector is arranged on each of two sides of the snap line on a back side of the fourth dielectric plate; at least one second slot is provided on each of the second reflectors, and a second diode is connected across the second slot; and the vertical polarization antenna is controlled to radiate an omnidirectional beam or a plurality of directional beams by controlling on or off of the plurality of second diodes; and an antenna board, including a fifth dielectric plate, where the third dielectric plate and the fourth dielectric plate are inserted in the fifth dielectric plate, and a first conductor plate is arranged on an upper surface of the fifth dielectric plate.

In accordance with another aspect of the present disclosure, an embodiment provides a method for controlling a reconfigurable antenna. The reconfigurable antenna is the reconfigurable antenna described above. The method includes: receiving a beam switching signal; controlling a bias voltage according to the beam switching signal; controlling on or off of the first diodes according to the bias voltage, where the horizontal polarization antenna is controlled by on or off of the first diodes to switch between radiating an omnidirectional beam and radiating a plurality of directional beams; and controlling on or off of the second diodes according to the bias voltage, where the vertical polarization antenna is controlled by on or off of the second diodes to switch between radiating an omnidirectional beam and radiating a plurality of directional beams.

In accordance with another aspect of the present disclosure, an embodiment provides a router, including the reconfigurable antenna described above.

In accordance with another aspect of the present disclosure, an embodiment provides a signal transceiving device, including the reconfigurable antenna described above.

Other aspects and advantages of the present disclosure will be given in the following description, some of which will become apparent from the following description or may be learned from practices of the present disclosure.

DETAILED DESCRIPTION

Figure 1:
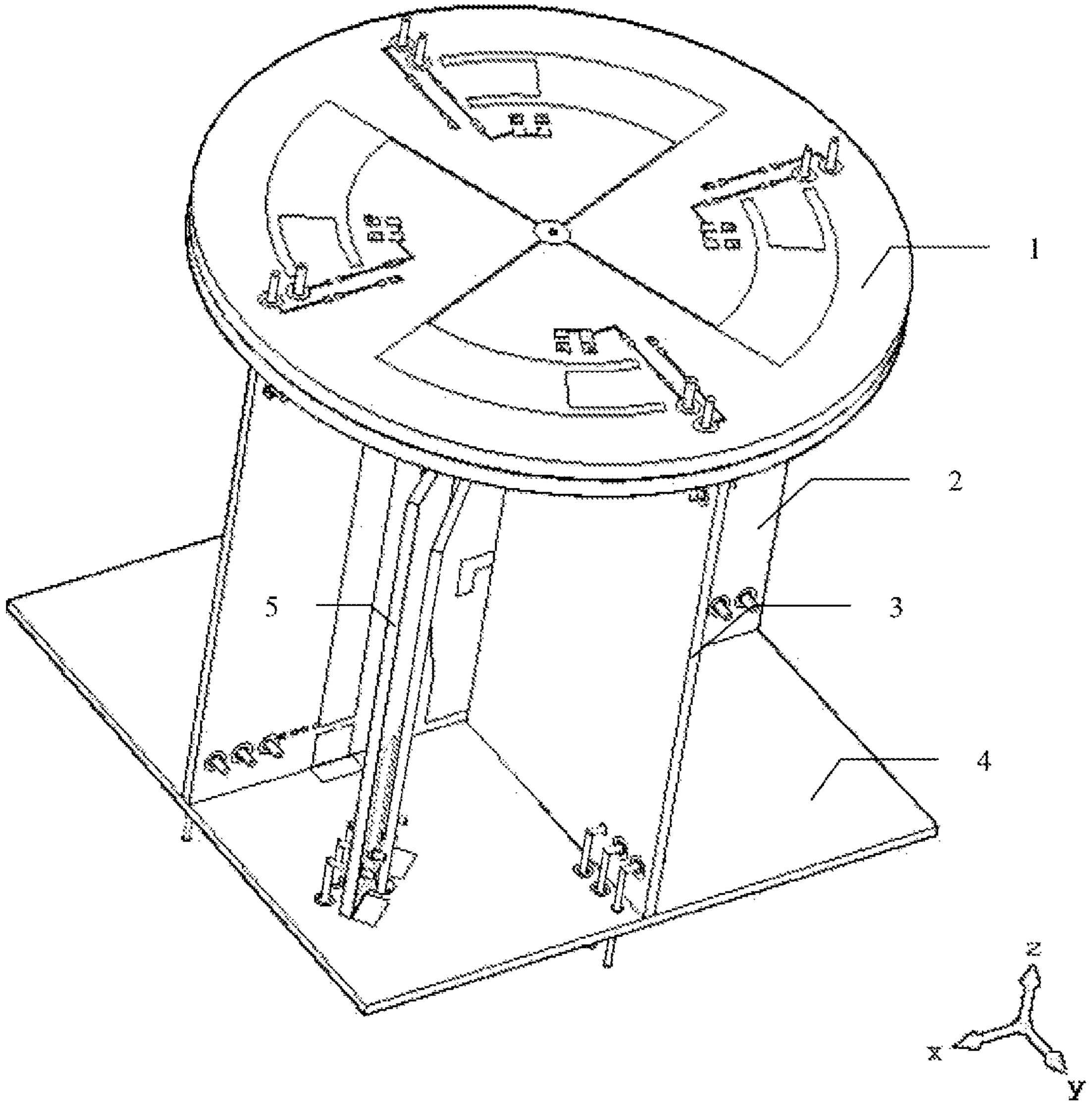
FIG. 1 is a schematic diagram of an overall structure of a reconfigurable antenna according to an embodiment of the present disclosure.

In order for those having ordinary skills in the art to better understand the present disclosure, the technical schemes in the embodiments of the present disclosure will be described clearly and fully in conjunction with the accompanying drawings in the embodiments of the present disclosure. Apparently, the embodiments described are merely some embodiments, rather than all of the embodiments of the present disclosure. All other embodiments obtained by those having ordinary skills in the art without creative efforts based on the embodiments of the present disclosure shall fall within the protection scope of the present disclosure.

In the description, claims, and accompanying drawings of the present disclosure, the terms such as "first", "second", "third", "fourth" and the like are intended to distinguish between different objects but do not indicate a particular order. In addition, the terms such as "comprise", "include", "have" and any variant thereof are intended to cover a non-exclusive inclusion. For example, a process, method, system, product, or device that includes a series of operations or units is not limited to including the listed operations or modules, but may further include an operation or unit that is not listed, or further include another operation or unit that is intrinsic to the process, method, product, or device.

Reference throughout this description to "an embodiment" means that a particular feature, structure, or characteristic described in connection with the embodiment is included in at least one embodiment of the present disclosure. Thus, the appearance of the phrase in various places throughout this description is not necessarily referring to the same embodiment of the present disclosure, nor is to be construed as a separate or alternative embodiment mutually exclusive to other embodiments. It is to be explicitly and implicitly understood by those having ordinary skills in the art that the embodiments described herein may be combined with other embodiments.

First, the related terms involved in the embodiments of the present disclosure are described.

Horizontal polarization antenna: an antenna in which the direction of electric field intensity formed during radiation is parallel to the ground during radiation.

Vertical polarization antenna: an antenna in which the direction of electric field intensity formed during radiation is perpendicular to the ground.

Omnidirectional antenna: an antenna with uniform radiation at 360 degrees in the horizontal directivity pattern. A smaller lobe width of the antenna indicates a greater gain.

Directional antenna: an antenna that radiates in a certain angular range in the horizontal directivity pattern. A smaller lobe width of the antenna indicates a greater gain.

In some cases, wireless communication is needed in places such as industrial parks, hotels, office buildings, transportation hubs, and large venues. However, the user density in these places changes greatly and the environments are complex. For example, an industrial park generally includes office buildings, manufacturing buildings, canteens, staff quarters, or warehouses of some companies. The buildings in the park are basically reinforced concrete structures and are usually located next to each other. Generally, the interior of a building is divided into multiple rooms by reinforced concrete walls. The building also includes stairs, corridors, and other auxiliary facilities. Electromagnetic waves experience great losses when propagating through these places, affecting the reliability of the communication system to a great extent. These places not only have complex indoor layout, but also have a high user density. For example, there is a large flow of people in the industrial park during working hours, requiring a high WLAN capacity; while there is a small flow of people in the industrial park after work, with a less demand for network use. Hotels have more customers during the peak tourist season and fewer customers during the off-season, so the demand for the network is constantly changing over time. To sum up, due to the complex layout of these places and the change of user density, the deployed WLAN needs to have satisfactory environmental adaptability and flexibility. The performance of WLAN systems is largely determined by antenna devices. However, existing antenna devices are often unable to provide omnidirectional radiation and directional radiation at the same time. Even if some antenna devices can provide omnidirectional radiation and directional radiation at the same time, they can only provide limited directional beams and do not support free switching between omnidirectional and directional beams.

An embodiment of the present disclosure provides a reconfigurable antenna, including: a horizontal polarization antenna, including a patch structure arranged on an upper surface of a first dielectric plate and a first reflector arranged on a lower surface of the first dielectric plate, where a plurality of first slots are provided on the first reflector, the first reflector is electrically connected at each of the first slots to a first diode on the upper surface of the first dielectric plate, and the horizontal polarization antenna is controlled to radiate an omnidirectional beam or a plurality of directional beams by controlling on or off of the plurality of first diodes; a vertical polarization antenna, arranged below the horizontal polarization antenna and including a third dielectric plate and a fourth dielectric plate which are perpendicular to the first dielectric plate, where the third dielectric plate and the fourth dielectric plate are snap-fitted along a snap line perpendicular to the first dielectric plate to form a unity; a radiation patch is arranged on a back side of the third dielectric plate at the snap line, and at least one second reflector is arranged on each of two sides of the radiation patch; at least one second reflector is arranged on each of two sides of the snap line on a back side of the fourth dielectric plate; at least one second slot is provided on each of the second reflectors, and a second diode is connected across the second slot; and the vertical polarization antenna is controlled to radiate an omnidirectional beam or a plurality of directional beams by controlling on or off of the plurality of second diodes; and an antenna board, including a fifth dielectric plate, where the third dielectric plate and the fourth dielectric plate are inserted in the fifth dielectric plate, and a first conductor plate is arranged on an upper surface of the fifth dielectric plate.

According to some embodiments of the present disclosure, the patch structure includes a plurality of Alford loop antennas arranged discretely, an annular segment is cut off from a tail of each of the Alford loop antennas, and a head of each of the Alford loop antennas is connected to a feed point through an impedance transformer.

According to some embodiments of the present disclosure, four first slots are provided on the first reflector, the second reflector is connected to four first diodes, and the four first diodes are adjacent in pairs. When all the four first diodes are in an off state, the horizontal polarization antenna radiates an omnidirectional beam. Alternatively, when two adjacent first diodes of the four first diodes are in the off state and the other two first diodes are in an on state, the horizontal polarization antenna radiates a directional beam.

According to some embodiments of the present disclosure, the reconfigurable antenna further includes a plurality of sets of first bias lines arranged on the first dielectric plate, the third dielectric plate, and the fourth dielectric plate, each set of first bias lines is configured for applying a bias voltage to the plurality of first diodes, and the bias voltage is configured for controlling on or off of the plurality of first diodes.

According to some embodiments of the present disclosure, the reconfigurable antenna further includes a plurality of sets of second bias lines arranged on the third dielectric plate or the fourth dielectric plate, the second bias lines are configured for applying a bias voltage to the plurality of second diodes, and the bias voltage is configured for controlling on or off of the plurality of second diodes.

According to some embodiments of the present disclosure, the first bias lines or the second bias lines include two or more short bias lines spaced apart, and a choke inductance element is connected across a spacing between two short bias lines.

According to some embodiments of the present disclosure, a first capacitor element is further connected between the first bias line and the first diode; and/or a second capacitor element is connected between the second bias line and the second diode.

According to some embodiments of the present disclosure, the horizontal polarization antenna further includes a second dielectric plate. The second dielectric plate is arranged on a lower surface of the first reflector, a ring-shaped metal patch is arranged on a lower surface of the second dielectric plate, and a plurality of third slots are etched along a radius of the ring-shaped metal patch.

According to some embodiments of the present disclosure, two second reflectors are arranged on the back side of the third dielectric plate, two second reflectors are arranged on the back side of the fourth dielectric plate, one second slot is provided on each of the second reflectors, and four second diodes connected across the four second slots are adjacent in pairs. When all the four second diodes are in the off state, the vertical polarization antenna radiates an omnidirectional beam. Alternatively, when two adjacent first diodes of the four first diodes are in the off state and the other two first diodes are in the on state, the vertical polarization antenna radiates a directional beam. Alternatively, when three of the four first diodes are in the off state and the other one first diode is in the on state, the vertical polarization antenna radiates a directional beam.

According to some embodiments of the present disclosure, a feeding patch is arranged at a center line of a front surface of the third dielectric plate to coupling-feed the radiation patch.

According to some embodiments of the present disclosure, the radiation patch is a monopole patch, and a fourth slot is provided on the monopole patch.

According to some embodiments of the present disclosure, the reconfigurable antenna further includes a choke plate inserted in the antenna board to counteract a secondary radiation generated by a surface current of a first coaxial cable, and the first coaxial cable is configured for feeding the horizontal polarization antenna.

According to some embodiments of the present disclosure, the choke plate includes a sixth dielectric plate and a second conductor plate arranged on a top layer of the sixth dielectric plate, and a pair of fifth slots are provided on the second conductor plate.

Figure 2:
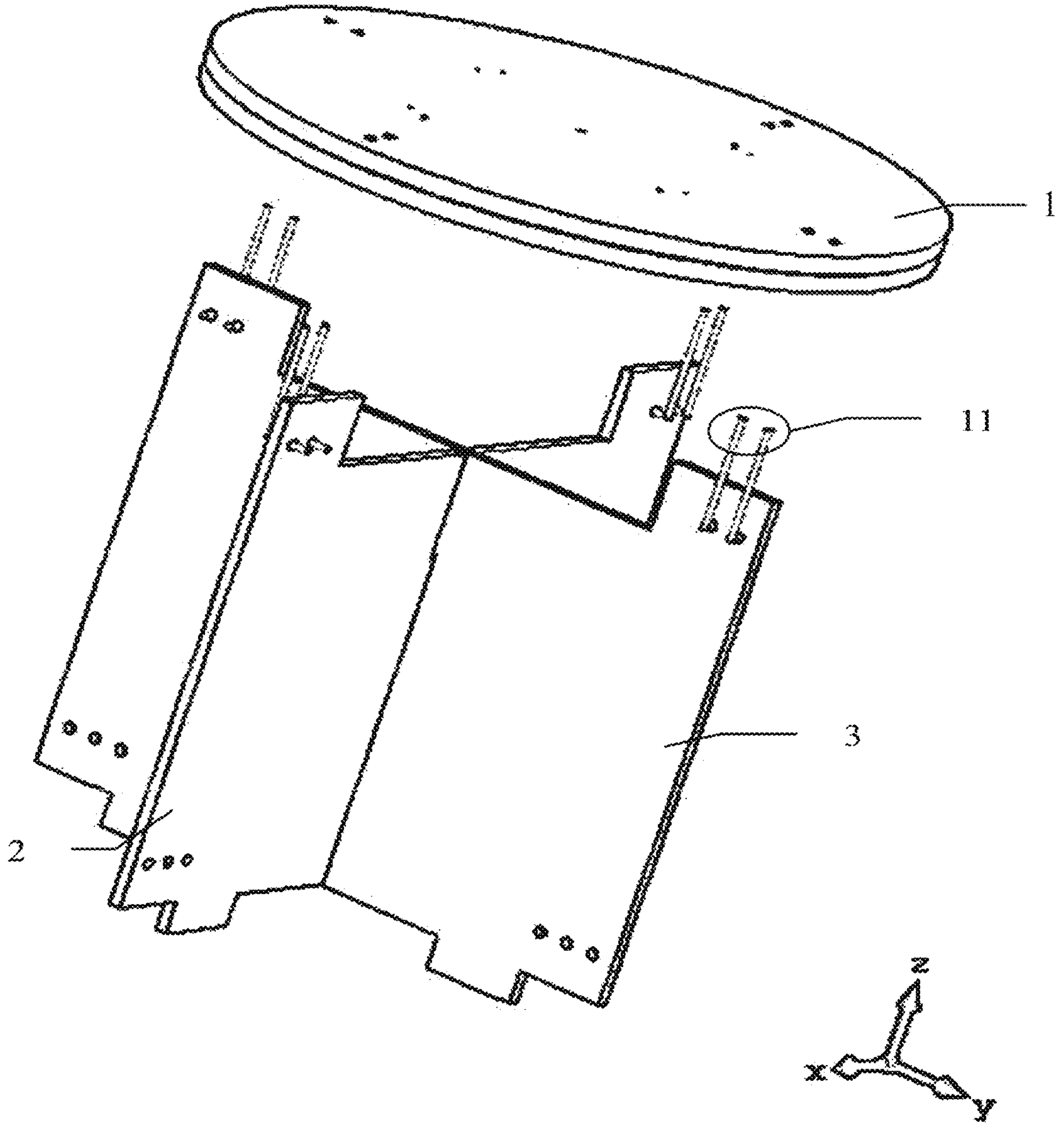
FIG. 2 is a schematic diagram showing connection between a horizontal polarization antenna and a vertical polarization antenna according to an embodiment of the present disclosure.
Figure 3:
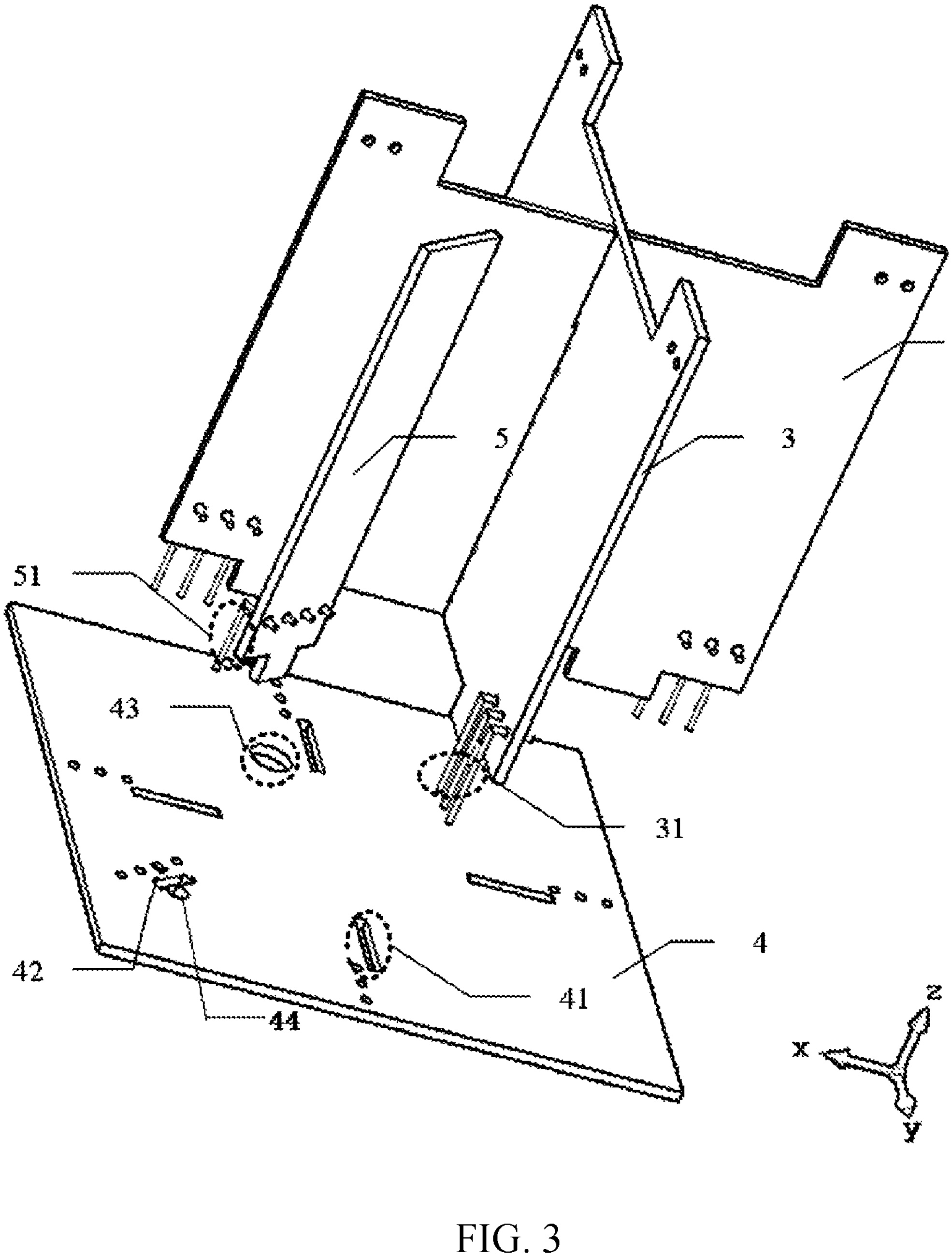
FIG. 3 is a schematic diagram showing connection between a vertical polarization antenna, a choke plate, and an antenna board according to an embodiment of the present disclosure.

An embodiment of the present disclosure provides a reconfigurable antenna. FIG. 1 is a schematic diagram of an overall structure of the reconfigurable antenna. As shown in FIG. 1, the reconfigurable antenna includes a horizontal polarization antenna 1, a vertical polarization antenna, an antenna board 4, and a choke plate 5. The vertical polarization antenna includes a first vertical polarization antenna board 2 and a second vertical polarization antenna board 3. FIG. 2 is a schematic diagram showing connection between the horizontal polarization antenna and the vertical polarization antenna. As shown in FIG. 2, the horizontal polarization antenna 1 is connected to the first vertical polarization antenna board 2 and the second vertical polarization antenna board 3 through four sets of first pins 11. FIG. 3 is a schematic diagram showing connection between the vertical polarization antenna, the choke plate, and the antenna board. As shown in FIG. 3, the first vertical polarization antenna board 2 and the second vertical polarization antenna board 3 are connected to the antenna board 4 through four sets of second pins 31 and four first slots 41. The choke plate 5 is connected to the antenna board 4 through third pins 51 and a second slot 42. A first circular groove 43 and a second circular groove 44 are provided on the antenna board 4 for a coaxial cable feeding the horizontal polarization antenna and a coaxial cable feeding the vertical polarization antenna to respectively pass through. It can be understood that the connection components for connecting the horizontal polarization antenna and the vertical polarization antenna and the connection components for connecting the vertical polarization antenna, the choke plate, and the antenna board may be configured according to specific situations. Different connection components may be used according to different materials and shapes of the connection components. In the embodiments of the present disclosure, the use of the first pins as the connection components for connecting the horizontal polarization antenna and the vertical polarization antenna is merely an example, and the use of the second pins and the third pins as the connection components for connecting the vertical polarization antenna, the choke plate, and the antenna board is also merely an example.

Figure 4:
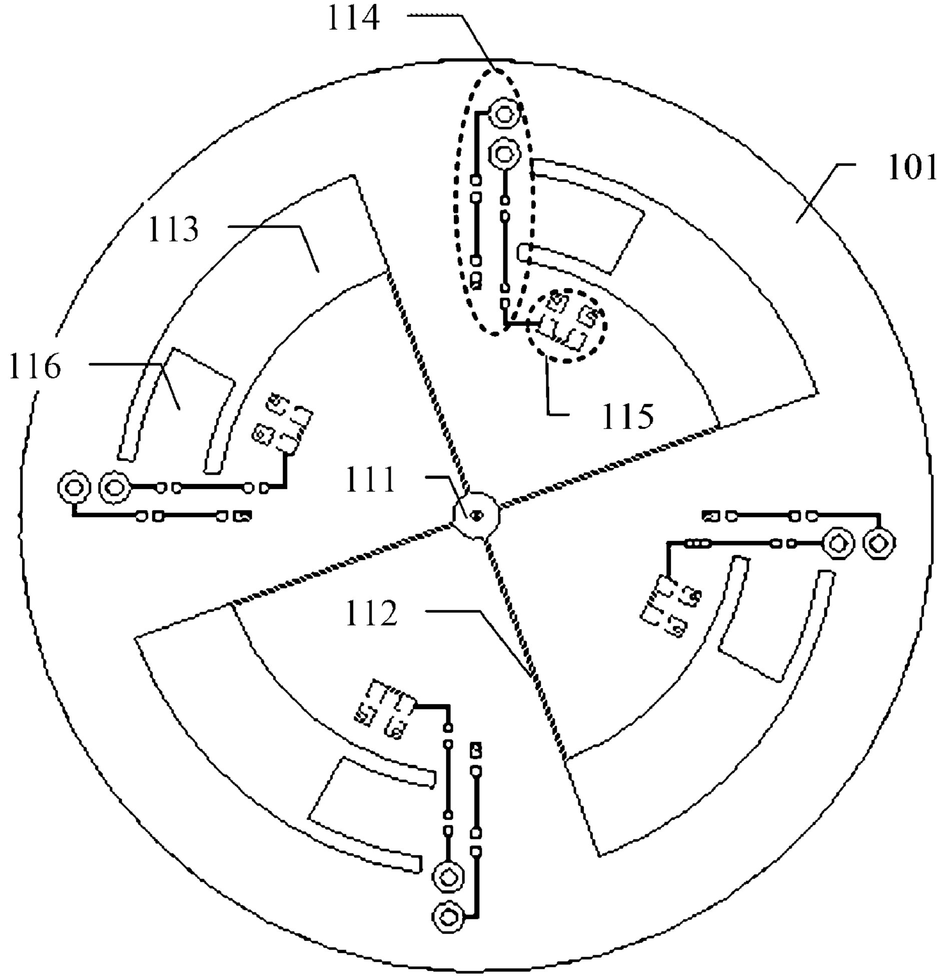
FIG. 4 is a structural top view of a top layer of a horizontal polarization antenna according to an embodiment of the present disclosure.
Figure 5:
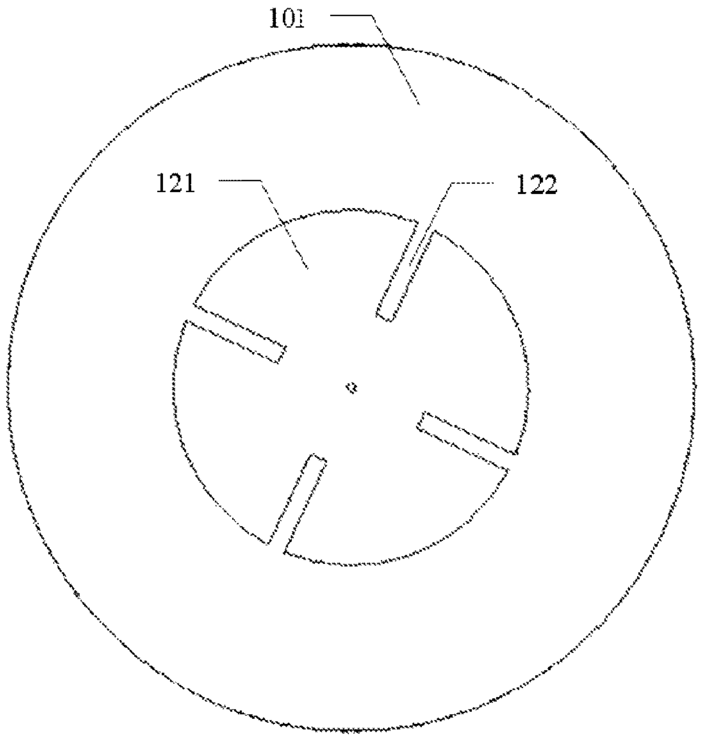
FIG. 5 is a structural top view of a bottom layer of a horizontal polarization antenna according to an embodiment of the present disclosure.

In the embodiments of the present disclosure, the horizontal polarization antenna may be a three-layer structure, including a patch structure, a first dielectric plate, and a first reflector in sequence from top down. The first reflector of the horizontal polarization antenna may be a circular ground plate, and four rectangular first slots may be arranged on the circular ground plate. FIG. 4 is a structural top view of a top layer of the horizontal polarization antenna. FIG. 5 is a structural top view of a bottom layer of the horizontal polarization antenna. As shown in FIG. 4 to FIG. 5, the horizontal polarization antenna includes a patch structure 113 arranged on an upper surface of the first dielectric plate 101 and a circular ground plate 121 arranged on a lower surface of the first dielectric plate 101. A plurality of first slots 122 are provided on the circular ground plate 121. The circular ground plate 121 is electrically connected at each of the first slots 122 to a first diode 115 on the upper surface of the first dielectric plate 101. The horizontal polarization antenna is controlled to radiate an omnidirectional beam or a plurality of directional beams by controlling on or off of the plurality of first diodes 115.

It can be understood that there are a variety of options for the shape and size of the first dielectric plate of the horizontal polarization antenna. There are a variety of options for the shape and size of the first reflector of the horizontal polarization antenna. Different antenna gains can be obtained using different shapes (such as rectangular, trapezoidal, elliptical, etc.) and sizes. There are a variety of options for the number (e.g., which may be defined as n, n>1), size, and shape (for example, trapezoidal, triangular, elliptical, etc.) of the first slots. The number of directional beams may be increased or decreased by increasing or decreasing the number of slots, and different antenna gains can be obtained by different slot sizes. The first circular dielectric plate, the circular ground plate, and the rectangular slots in the embodiments of the present disclosure are merely examples of the first dielectric plate, the first reflector and the first slots, and are not to be construed as limiting the reconfigurable antenna.

In an embodiment of the present disclosure, as shown in FIG. 4, the patch structure of the horizontal polarization antenna includes four Alford loop antennas 113 arranged discretely, an annular segment 116 is cut off from a tail of each of the Alford loop antennas, and a head of each of the Alford loop antennas is connected to a feed point 111 through an impedance transformer 112.

It can be understood that there are a variety of options for the type and number of antenna patches included in the patch structure. The patch structure including four Alford loop antennas arranged discretely in the embodiments of the present disclosure is merely an example of the antenna structure, and is not to be construed as limiting the reconfigurable antenna.

Figure 6:
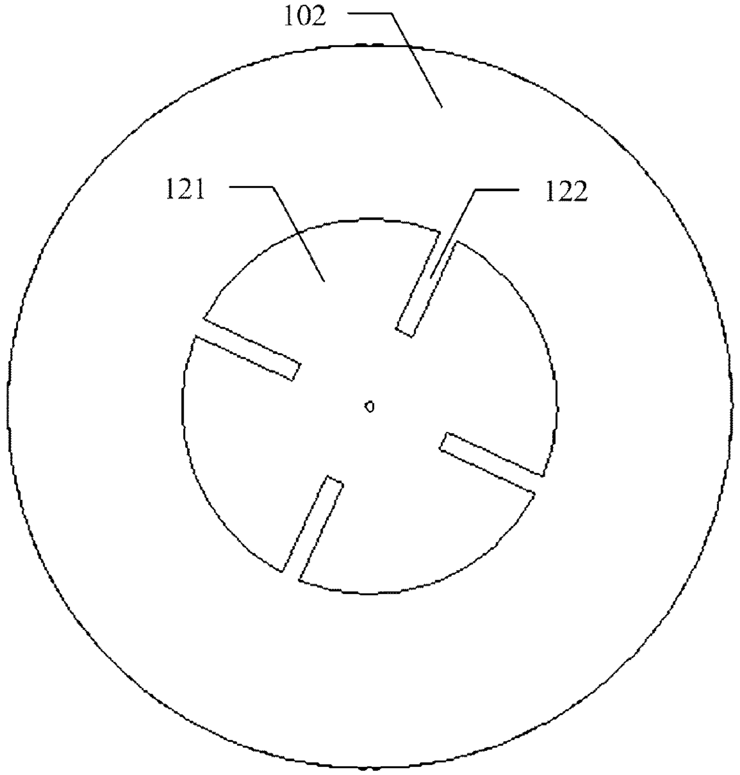
FIG. 6 is a structural top view of a first reflector and a second dielectric plate of a horizontal polarization antenna according to an embodiment of the present disclosure.
Figure 7:
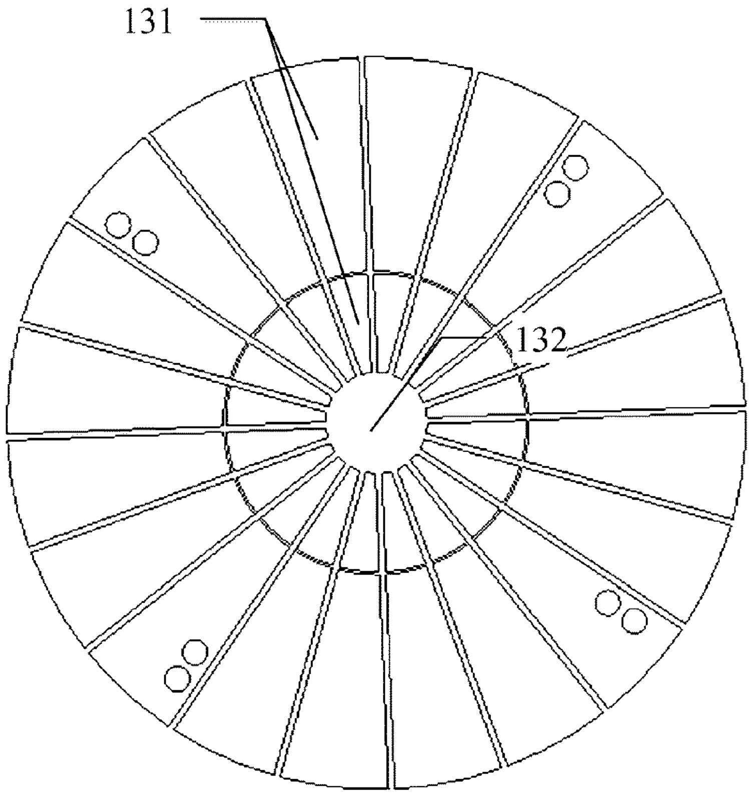
FIG. 7 is a structural top view of a circular ring-shaped metal patch of a horizontal polarization antenna according to an embodiment of the present disclosure.

In an embodiment of the present disclosure, the horizontal polarization antenna may be a five-layer structure, including a patch structure, a first dielectric plate, a first reflector, a second dielectric plate, and a ring-shaped metal patch in sequence from top down. FIG. 6 is a structural top view of the first reflector and the second dielectric plate of the horizontal polarization antenna. FIG. 7 is a structural top view of the ring-shaped metal patch of the horizontal polarization antenna. Referring to FIG. 6 to FIG. 7, a second dielectric plate 102 is arranged on a lower surface of the circular ground plate 121, and a ring-shaped metal patch is arranged on a lower surface of the second dielectric plate 102. The ring-shaped metal patch may be a circular ring-shaped metal patch, and the plurality of third slots are etched along a radius of the circular ring-shaped metal patch 131. The horizontal polarization antenna in this embodiment includes the patch structure and the first dielectric plate in FIG. 4, the first reflector and the second dielectric plate in FIG. 6, and the circular ring-shaped metal patch in FIG. 7. The horizontal polarization antenna can operate in a WLAN 2.4 GHz band. The material of the first dielectric plate 101 and the second dielectric plate 102 is FR-4, and the first dielectric plate 101 and the second dielectric plate 102 each have a radius of 29 mm and a thickness of 1.6 mm. The four Alford loop antennas 113 are printed on the top layer of the horizontal polarization antenna part to generate horizontally polarized radiation waves in a circumferential direction. An annular segment 116 of a certain size is cut off from a tail of each Alford loop antenna. The sector angle of each Alford loop antenna 113 is 61 degrees, and the Alford loop antenna has an inner diameter of 16.5 mm and an outer diameter of 23 mm. Impedance matching of the feed point (circular pad) 111 to the Alford loop antennas 113 is achieved by four quarter-wavelength impedance transformers 112. The impedance transformer 112 has a length of 15 mm and a width of 0.2 mm. As shown in FIG. 6, the circular ground plate 121 has a radius of 15 mm, and the size of the first slot 122 etched on the circular ground plate 121 is 8.5 mm*1.5 mm. As shown in FIG. 7, at the bottommost layer of the horizontal polarization antenna, a circular ring-shaped metal patch 131 etched with 20 intermediate slots forms an isolation shield. The circular ring-shaped metal patch has an inner diameter of 4 mm and an outer diameter of 29 mm. A circular through hole 132 with a radius of 4 mm is provided in the middle of the second dielectric plate for soldering an outer conductor of a coaxial cable to the ground plate 121 of the horizontal polarization antenna. An inner conductor of the coaxial cable passes through the first dielectric plate 101 and the second dielectric plate 102 to be soldered to the feed point (circular pad) 111 to feed the horizontal polarization antenna. The circular ground plate 121 is electrically connected at each of the first slots 122 to a first diode 115 on the upper surface of the first dielectric plate 101. The horizontal polarization antenna is controlled to radiate an omnidirectional beam or a plurality of directional beams by controlling on or off of four first diodes 115.

The horizontal polarization antenna further includes: first bias lines arranged on the upper surface of the first dielectric plate and configured for applying a bias voltage to the plurality of first diodes. On or off of the plurality of first diodes is controlled according to a change in the bias voltage. The first bias lines include two or more first short bias lines spaced apart, and an inductor element is connected across a spacing between two first short bias lines. A capacitor element may further be connected between the first bias line and the first diode. Referring to FIG. 4, four sets of first bias lines 114 are arranged on the first dielectric plate. A segment of bias line in each set of first bias lines is connected to the first diode, to apply the bias voltage to the first diode through the first bias line. In an implementation, a first capacitor element may further be connected between the first bias line and the first diode.

It should be noted that, in the embodiments of the present disclosure, the term "connected across" means that an inductor element is arranged between two first short bias lines, with one end of the inductor element connected to one of the first short bias lines, and the other end of the inductor element connected to the other first short bias line, such that the inductor element is connected across the spacing.

Figure 8:
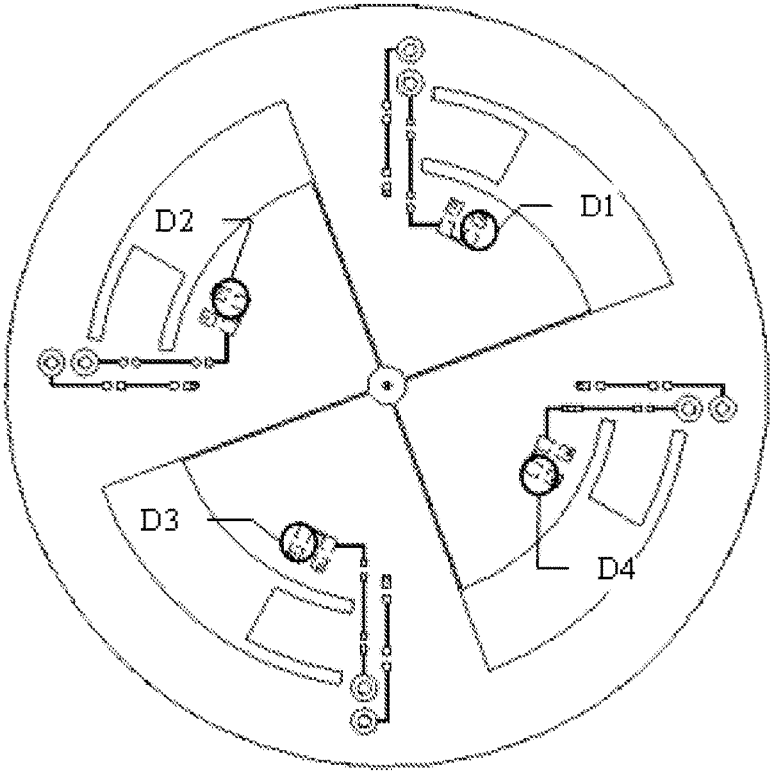
FIG. 8 is a schematic diagram showing an arrangement of first diodes of a horizontal polarization antenna according to an embodiment of the present disclosure.

FIG. 8 is a schematic diagram showing an arrangement of diodes of the horizontal polarization antenna. Referring to FIG. 8, a first diode is soldered to two pads in a circle corresponding to each set of first bias lines, a first capacitor element is soldered to another two pads in the circle, and two of the four pads distant from the feed point (circular pad) 111 are connected to a first reflector etched with first slots through metallized vias. The first bias line 114 supplies the bias voltage. On or off of the first diodes is controlled according to the change of the bias voltage, so as to control the change of the electrical length of the first reflector of the antenna. The current distribution changes with the change of the electrical length. As such, beam switching of the horizontal polarization antenna is realized. In FIG. 8, the four first diodes are diode D1, diode D2, diode D3, and diode D4, respectively. When a forward voltage is applied to the diode, the diode may be in an on state indicated by 1, or in an off state indicated by 0. Table 1 shows a method for controlling beam switching of the horizontal polarization antenna, including five code states 0000, 0110, 0011, 1001, and 1100 and directivity pattern features generated in these states. The directivity pattern features include one omnidirectional beam and four directional beams. When all the four first diodes are in the off state, the horizontal polarization antenna radiates the omnidirectional beam. Alternatively, when two adjacent first diodes of the four first diodes are in the off state and the other two first diodes are in the on state, the horizontal polarization antenna radiates a directional beam.

TABLE 1

| Directivity pattern state | Code state (D1, D2, D3, D4) | Beam pointing |
|---|---|---|
| State 1 | 0000 | Omnidirectional radiation |
| State 2 | 0110 | $\varphi = 48°$ |
| State 3 | 0011 | $\varphi = 131°$ |
| State 4 | 1001 | $\varphi = 230°$ |
| State 5 | 1100 | $\varphi = 321°$ |

Figure 9:
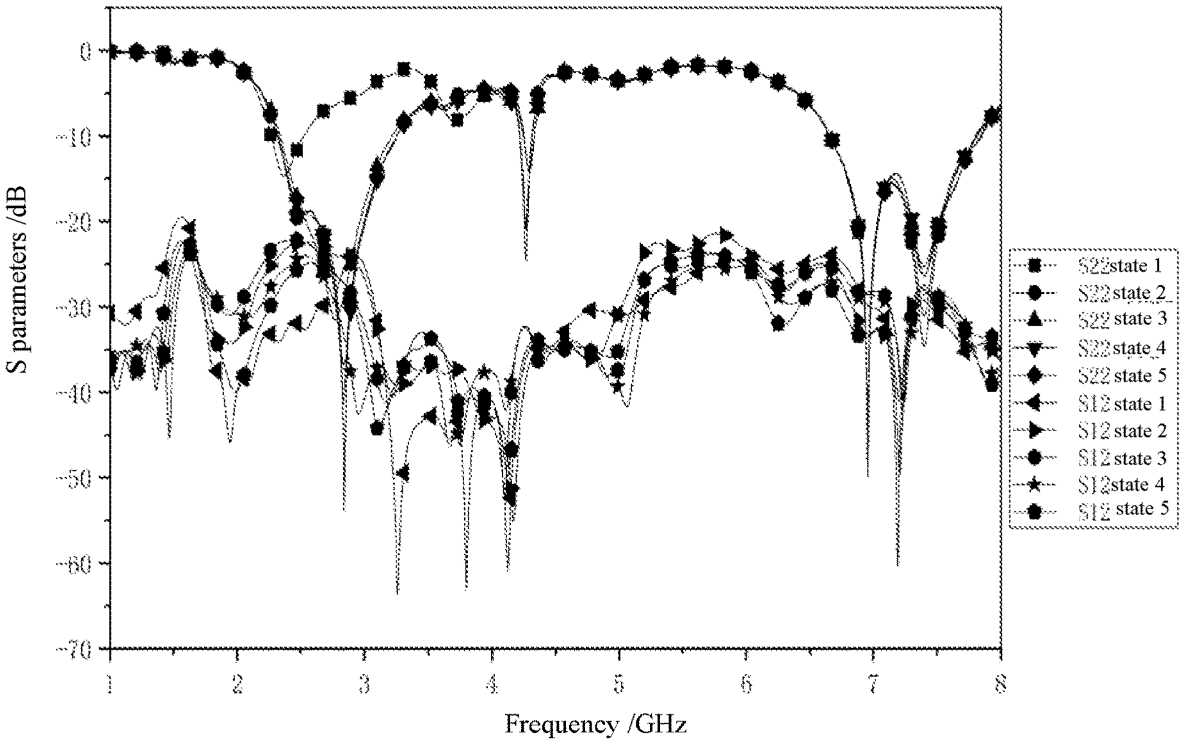
FIG. 9 is a graph of S parameters of a horizontal polarization antenna in five radiation states according to an embodiment of the present disclosure.
Figure 10:
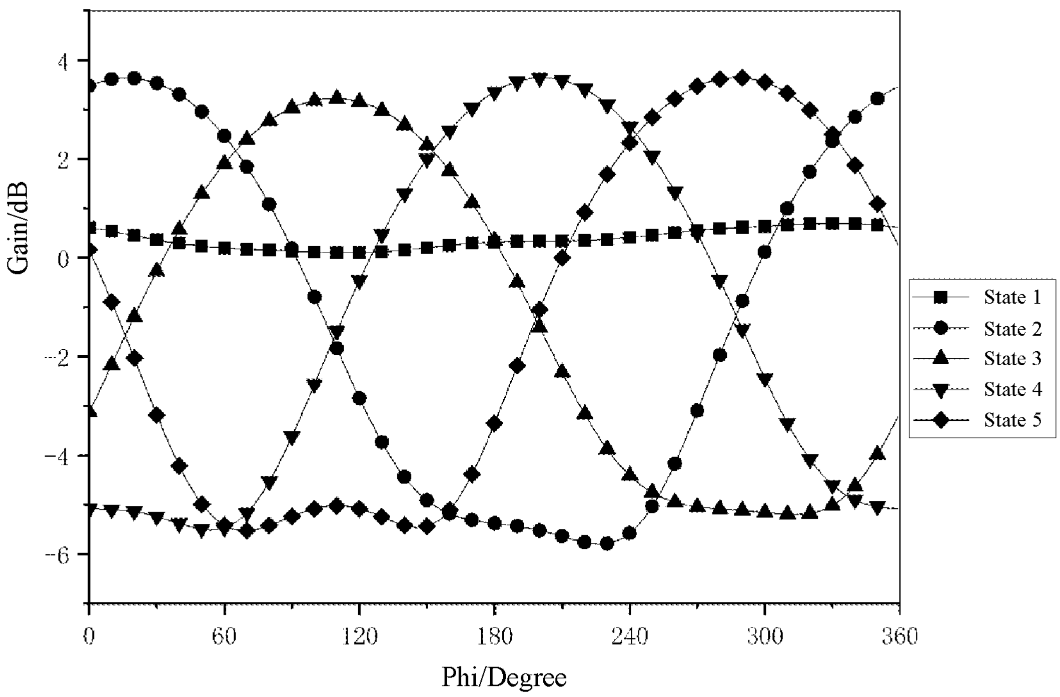
FIG. 10 is a gain directivity pattern of a horizontal polarization antenna in five radiation states according to an embodiment of the present disclosure.
Figure 11:
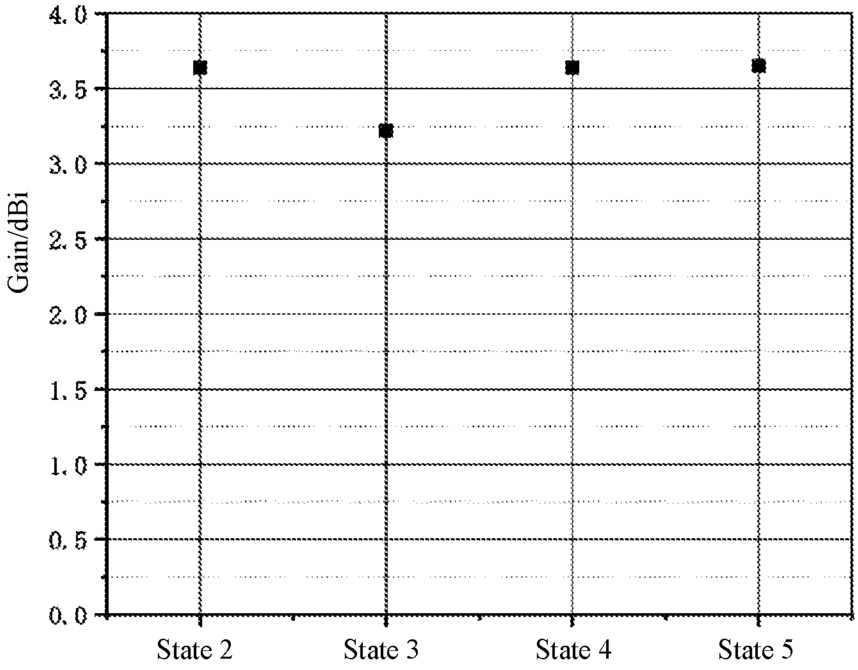
FIG. 11 is a schematic diagram of simulated main lobe gains of a horizontal polarization antenna in five radiation states according to an embodiment of the present disclosure.

In an embodiment of the present disclosure, a first coaxial cable is used to feed the horizontal polarization antenna. An outer conductor of the first coaxial cable is connected to the first reflector. An inner conductor of the first coaxial cable feeds the patch structure. The first coaxial cable extends through the antenna board 4, an inner ring of the ring-shaped metal patch, and the circular through hole 132 of the second dielectric plate of the reconfigurable antenna in sequence to be soldered to the first reflector. The inner conductor of the first coaxial cable extends through the circular through hole 132 of the second dielectric plate, a through hole at the center of the first reflector, and a through hole at the center of the first dielectric plate in sequence to be soldered to the feed point (circular pad) 111. When all the first diodes on the first slots 122 are off, the Alford loop antennas 113 can provide the omnidirectional beam and generate a horizontally polarized radiation wave with 360° coverage. Directional beams can be generated when any two adjacent two of the first diodes in the four first slots are on. FIG. 9 is a graph of S parameters (including S22 and S12) of the horizontal polarization antenna in five radiation states in the reconfigurable antenna of the present disclosure. FIG. 10 is a gain directivity pattern of the horizontal polarization antenna in five radiation states in the reconfigurable antenna of the present disclosure. As can be seen from FIG. 9 and FIG. 10, reflection coefficients of the horizontal polarization antenna designed in the present disclosure at 2.4 GHz to 2.835 GHz are all lower than-10 dB, and switching between the omnidirectional beam and the four directional beams is realized. FIG. 11 is a schematic diagram of simulated main lobe gains of a horizontal polarization antenna in five radiation states in the reconfigurable antenna of the present disclosure. It can be seen from FIG. 11 that the main lobe gain of each beam tested at 2.44 GHz is greater than 3.2 dBi, with the peak gain being 3.65 dBi.

It can be understood that there are a variety of options for the type, size, and number of antenna patches included in the patch structure. The patch structure including four Alford loop antennas arranged discretely in the embodiments of the present disclosure is merely an example of the antenna structure, and is not to be construed as limiting the electronically controlled beam scanning dual-polarization reconfigurable antenna. It can also be understood that there are a variety of options for the shapes and sizes of the first dielectric plate, the second dielectric plate, and the ring-shaped metal patch of the horizontal polarization antenna. Generally, the first dielectric plate, the second dielectric plate, and the ring-shaped metal patch are of the same shape. There are a variety of options for the shape and size of the first reflector of the horizontal polarization antenna. Different antenna gains can be obtained using different shapes (such as rectangular, trapezoidal, elliptical, etc.) and sizes. There are a variety of options for the number (e.g., which may be defined as n, n>1), size, and shape (for example, trapezoidal, triangular, elliptical, etc.) of the first slots. The number of directional beams may be increased or decreased by increasing or decreasing the number of slots, and different antenna gains can be obtained by different slot sizes. It should be noted that the number of first slots is the same as the number of first diodes. The first circular dielectric plate, the second circular dielectric plate, the circular ground plate, the circular ring-shaped metal patch, and the rectangular slots in the embodiments of the present disclosure are merely examples of the first dielectric plate, the second dielectric plate, the first reflector, and the first slots, and are not to be construed as limiting the electronically controlled beam scanning dual-polarization reconfigurable antenna.

In the embodiments of the present disclosure, the horizontal polarization antenna and the vertical polarized antenna are assembled by insertion to generate dual polarization characteristics. In the horizontal polarization antenna, the Alford loop antennas may be used as a radiation core, and the circular ground plate with four rectangular slots may be used as the first reflector. By changing the current distribution of the first reflector, switching of the horizontal polarization antenna between an omnidirectional beam and directional beams is realized. In the vertical polarized antenna, a monopole antenna may be placed vertically as a core, and four second reflectors are evenly placed in four directions around the monopole antenna. By changing the electrical length of the second reflector, switching of the vertical polarization antenna between an omnidirectional beam and directional beams is realized.

Figure 12:
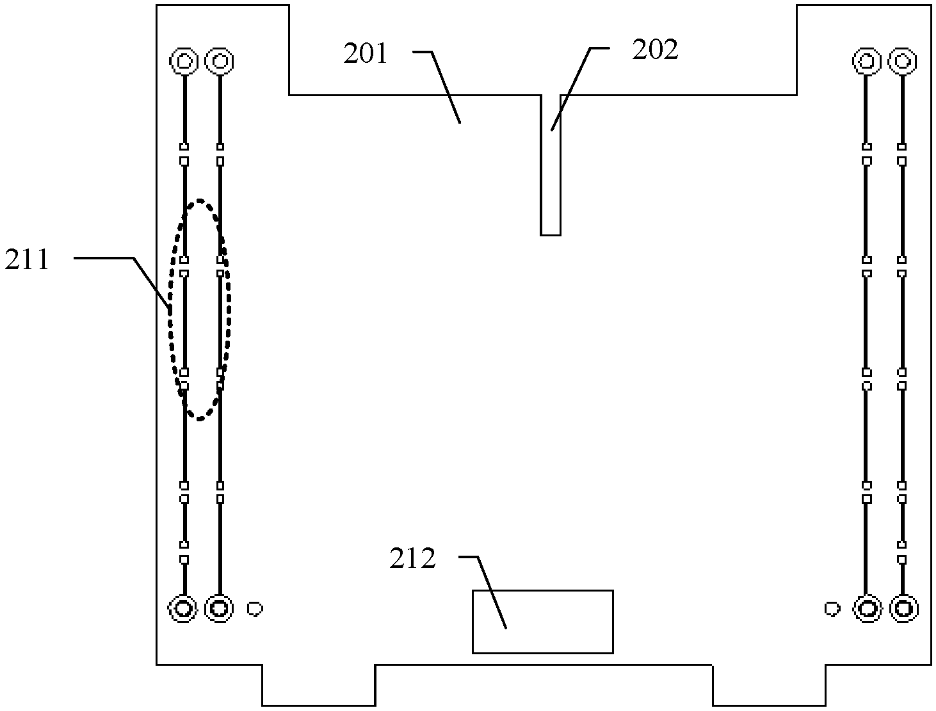
FIG. 12 is a schematic front view of a first vertical polarization antenna board according to an embodiment of the present disclosure.
Figure 13:
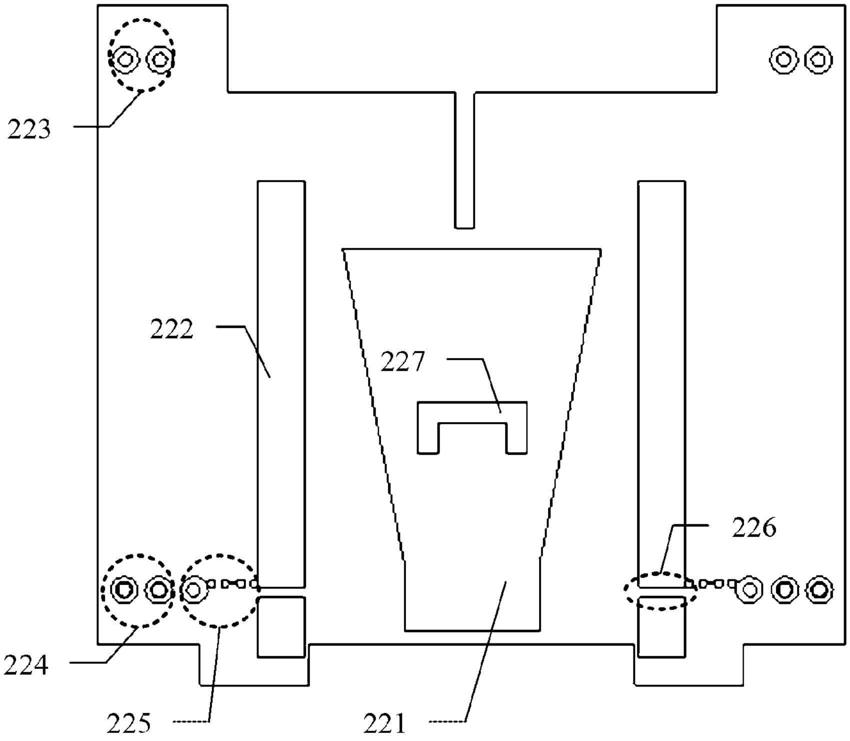
FIG. 13 is a schematic rear view of a first vertical polarization antenna board according to an embodiment of the present disclosure.
Figure 14:
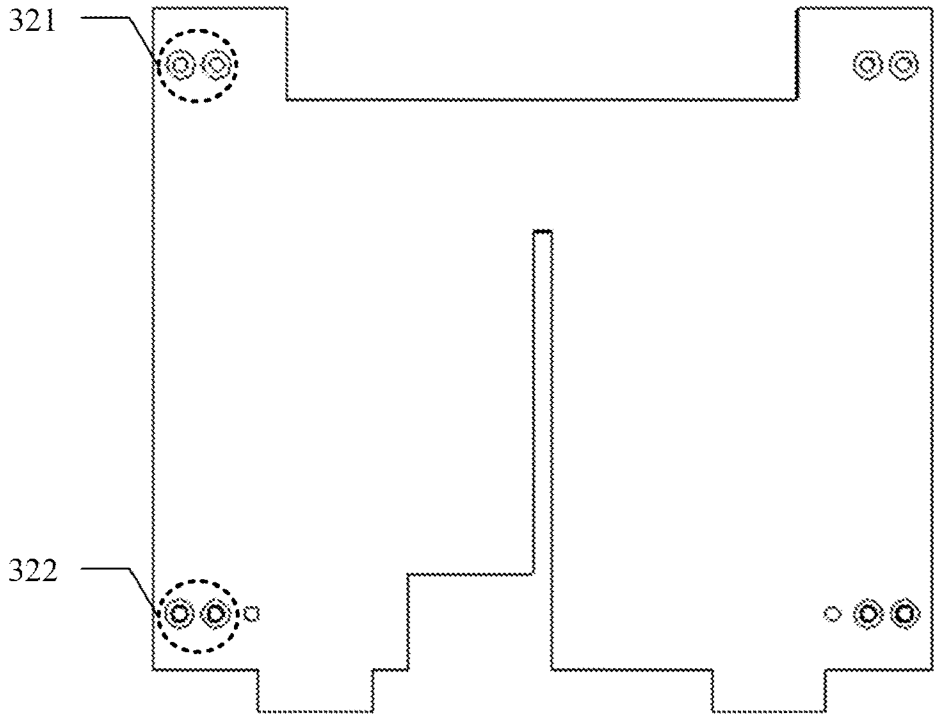
FIG. 14 is a schematic front view of a second vertical polarization antenna board according to an embodiment of the present disclosure.
Figure 15:
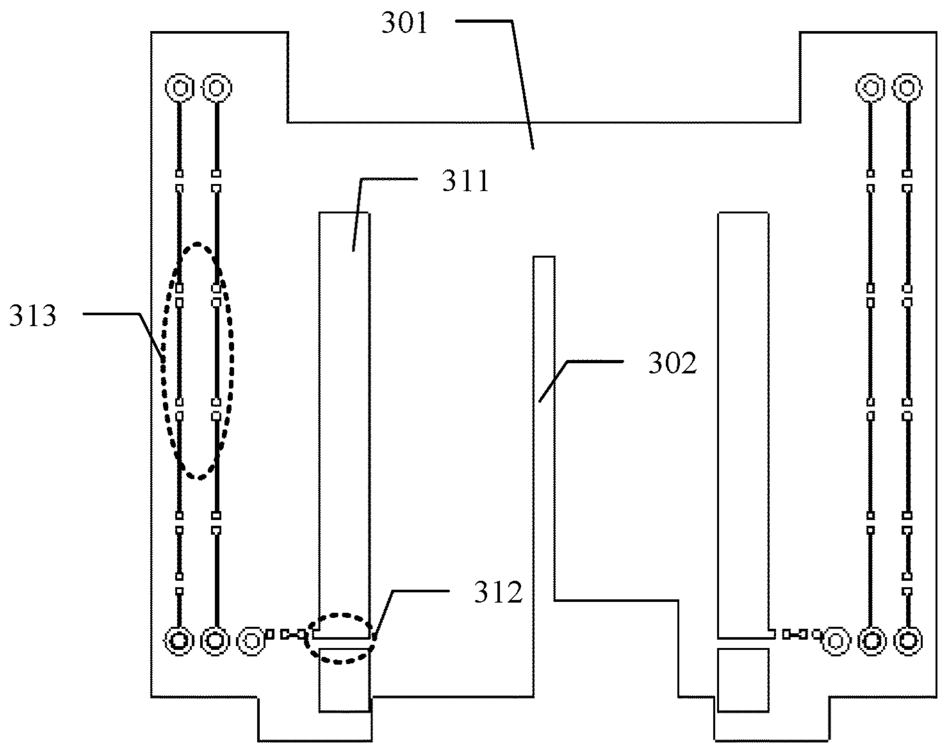
FIG. 15 is a schematic rear view of a second vertical polarization antenna board according to an embodiment of the present disclosure.

In an embodiment of the present disclosure, referring to FIG. 1, the vertical polarization antenna of the electronically controlled beam scanning dual-polarization reconfigurable antenna includes the first vertical polarization antenna board 2 and the second vertical polarization antenna board 3. FIG. 12 is a schematic front view of the first vertical polarization antenna board. FIG. 13 is a schematic rear view of the first vertical polarization antenna board. FIG. 14 is a schematic front view of the second vertical polarization antenna board. FIG. 15 is a schematic rear view of the second vertical polarization antenna board. Referring to FIG. 12 to FIG. 15, the first vertical polarization antenna board 2 includes a third dielectric plate 201 which is an FR-4 dielectric plate having a thickness of 1 mm. The second vertical polarization antenna board 3 includes a fourth dielectric plate 301, and the third dielectric plate 201 and the fourth dielectric plate 301 are all FR-4 dielectric plates having a thickness of 1 mm. Referring to FIG. 12, a first connection slot 202 is provided at a snap line of the third dielectric plate 201. Referring to FIG. 15, a second connection slot 302 is provided at a snap line of the fourth dielectric plate 301. The first vertical polarization antenna board 2 and the second vertical polarization antenna board 3 are snap-fitted together through the first connection slot 202 and the second connection slot 302. The snap line is perpendicular to the first dielectric plate of the horizontal polarization antenna. It should be noted that the snap line may be a center line of the third dielectric plate or the fourth dielectric plate. The first connection slot 202 and the second connection slot 302 may have a width of 1.3 mm. It can be understood that the materials and sizes of the dielectric plates and the size of the connection slots used in the vertical polarization antenna are merely examples, and are not to be construed as limiting the electronically controlled beam scanning dual-polarization reconfigurable antenna.

In an embodiment of the present disclosure, referring to FIG. 12 to FIG. 15, two sets of first bias lines 211 are further arranged on a front side of the third dielectric plate 201. Two ends of each bias line are respectively connected to a first metallized via 223 and a second metallized via 224. The first metallized vias 223 are configured for connecting the first bias lines 114 on the first dielectric plate on which the horizontal polarization antenna is arranged, and the second metallized vias 224 are configured for connecting pins between the antenna board 4 and the vertical polarization antenna, thereby applying a bias voltage to the first diodes. Two sets of first bias lines 313 are further arranged on a rear side of the fourth dielectric plate 301. Two ends of each bias line are respectively connected to a third metallized via 321 and a fourth metallized via 322. The third metallized vias 321 are configured for connecting the first bias lines 114 on the first dielectric plate on which the horizontal polarization antenna is arranged, and the fourth metallized vias 322 are configured for connecting pins between the antenna board 4 and the vertical polarization antenna, thereby applying a bias voltage to the first diodes. The first bias lines include two or more short bias lines spaced apart, and a choke inductance element is connected across a spacing between two short bias lines. It can be understood that the configuration of the bias lines used in the vertical polarization antenna is merely an example, and is not to be construed as limiting the electronically controlled beam scanning dual-polarization reconfigurable antenna.

It should be noted that, in the embodiments of the present disclosure, the term "connected across" means that a choke inductance element is arranged between two short bias lines, with one end of the choke inductance element connected to one of the short bias lines, and the other end of the choke inductance element connected to the other short bias line, such that the choke inductance element is connected across the spacing.

In an embodiment of the present disclosure, referring to FIG. 12, a feeding patch 212 may be arranged on a front side of the third dielectric plate 201. The feeding patch is configured for soldering to an inner conductor of a second coaxial cable feeding the vertical polarization antenna, to coupling-feed a radiation patch of the vertical polarization antenna. The feeding patch may be configured as a rectangular patch having a size of 10 mm*4.5 mm. Referring to FIG. 13, a radiation patch may be arranged on a back side of the third dielectric plate 201. The radiation patch may be a monopole patch 221 configured for radiating an electromagnetic wave. The monopole patch 221 may be in the shape of an inverted triangle. A fourth slot 227 is etched on the monopole patch 221 to provide a wave trap function for the 5 GHz band to reduce interference. Referring to FIG. 12 to FIG. 15, at least one second reflector is arranged on each of two sides of the monopole patch 221, and at least one second reflector is arranged on each of two sides of a center line of a back side of the fourth dielectric plate. At least one second slot is provided on the second reflector. A second diode is connected across each second slot. The size of the second reflector may be 35 mm*3.5 mm. It should be noted that the second diode being connected across the second slot means that two ends of the second diode are respectively connected at the two ends of the second slot, so as to be connected to conductors of the second reflector that are at the two ends of the second slot. Referring to FIG. 13, one second reflector 222 may be arranged on each of the two sides of the monopole patch 221, one second slot is provided on the second reflector 222, and one second diode 226 is connected across each second slot. The second diode 226 is electrically connected to the second bias line 225. The second bias line 225 is connected to pins between the antenna board 4 and the vertical polarization antenna through metallized vias. Referring to FIG. 15, one second reflector 311 may be arranged on each of the two sides of the center line of the back side of the fourth dielectric plate, one second slot is provided on the second reflector 311, and one second diode 312 is connected across each second slot. The second bias line provides a bias voltage to the second diodes 312 on the fourth dielectric plate of the vertical polarization antenna, and on or off of the second diodes 312 is controlled according to a change in the bias voltage. In an implementation, a capacitor element may further be connected between the second bias line and the second diode. It can be understood that the use of the feeding patch to feed the monopole antenna 221 is merely an example of the feeding method and is not to be construed as limiting the electronically controlled beam scanning dual-polarization reconfigurable antenna, and other feeding methods may also be used as long as the purpose of feeding the monopole antenna can be realized. It can also be understood that the sizes of the feeding patch and the second reflectors and the arrangement of the second bias lines are also merely examples, and are not to be construed as limiting the electronically controlled beam scanning dual-polarization reconfigurable antenna.

The monopole patch may be in a variety of shapes, such as rectangle, trapezoid, cone, circular ring, and so on. The number of second reflectors may have a variety of values. Different antenna gains can be obtained with different numbers of second reflectors. The size parameter of the second reflector may have a variety of values. Different antenna gains can be obtained with different size parameters.

Figure 16:
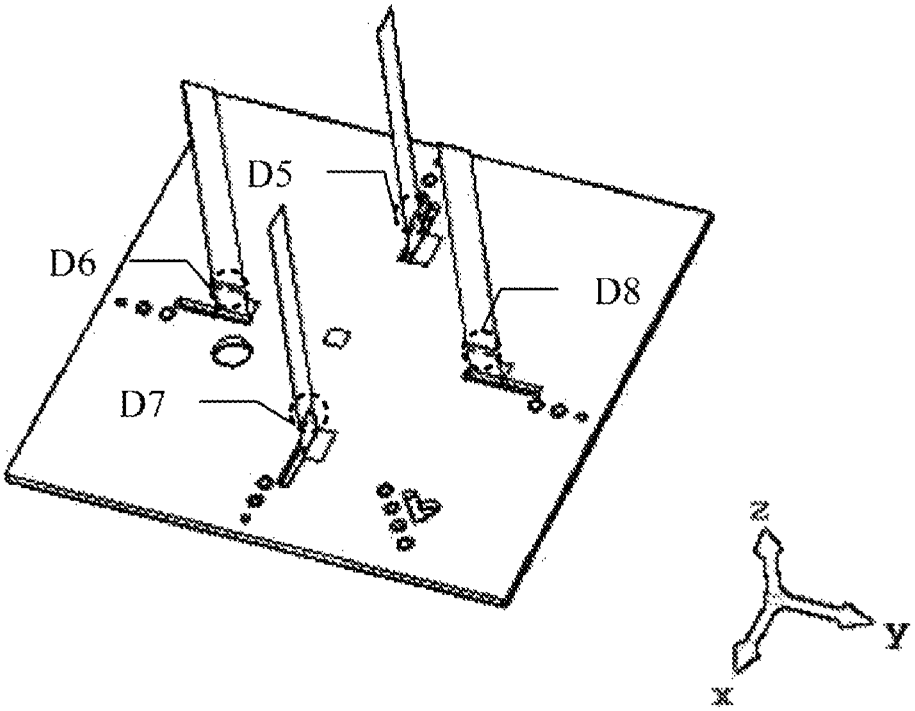
FIG. 16 is a schematic diagram showing an arrangement of second diodes of a vertical polarization antenna according to an embodiment of the present disclosure.

FIG. 16 is a schematic diagram showing an arrangement of diodes of the vertical polarization antenna according to an embodiment of the present disclosure. Referring to FIG. 16, a second diode is connected across the fourth slot of each second reflector of the vertical polarization antenna. The four second diodes are diode D5, diode D6, diode D7, and diode D8, respectively. When a forward voltage is applied to the diode, the diode may be in an on state indicated by 1, or in an off state indicated by 0. Table 2 shows a method for controlling beam switching of the vertical polarization antenna, including nine code states 0000, 0010, 0011, 0001, 1001, 1000, 1100, 0100, and 0110 and directivity pattern features generated in these states. The directivity pattern features include one omnidirectional beam and eight directional beams. When all the four second diodes are in the off state, the vertical polarization antenna radiates the omnidirectional beam and generates a horizontally polarized radiation wave with 360° coverage. When two adjacent second diodes of the four second diodes are in the off state and the other two second diodes are in the on state, the vertical polarization antenna radiates a directional beam. When three of the four second diodes are in the off state and the other one second diode is in the on state, the vertical polarization antenna radiates a directional beam.

TABLE 2

| Directivity pattern state | Code state of diode (D5, D6, D7, D8) | Beam pointing |
|---|---|---|
| State 1 | 0000 | Omnidirectional radiation |
| State 2 | 0010 | $\varphi = 1°$ |
| State 3 | 0011 | $\varphi = 46°$ |
| State 4 | 0001 | $\varphi = 93°$ |
| State 5 | 1001 | $\varphi = 135°$ |
| State 6 | 1000 | $\varphi = 188°$ |
| State 7 | 1100 | $\varphi = 221°$ |
| State 8 | 0100 | $\varphi = 271°$ |
| State 9 | 0110 | $\varphi = 318°$ |

Figure 17:
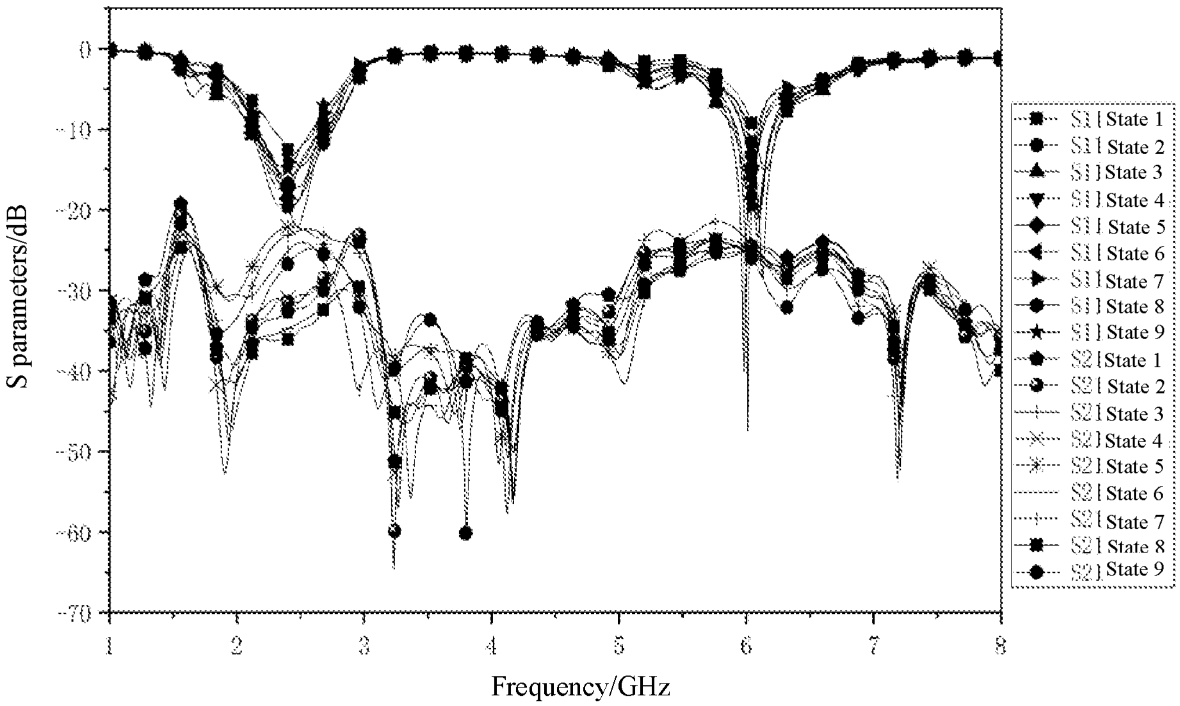
FIG. 17 is a graph of S parameters of a vertical polarization antenna in nine radiation states according to an embodiment of the present disclosure.
Figure 18:
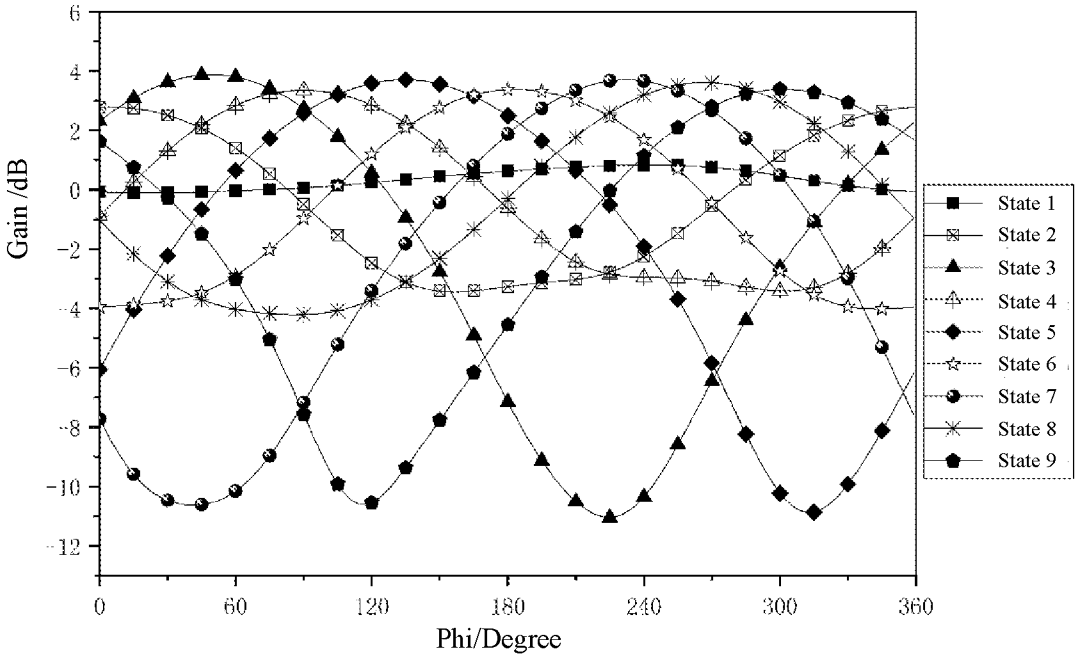
FIG. 18 is a gain directivity pattern of a vertical polarization antenna in nine radiation states according to an embodiment of the present disclosure.
Figure 19:
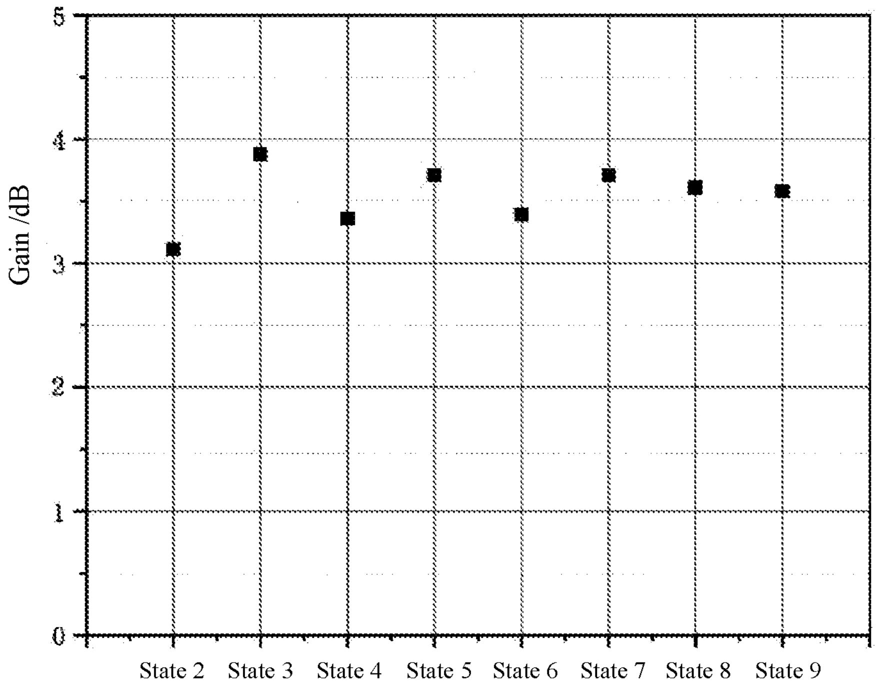
FIG. 19 is a schematic diagram of simulated main lobe gains of a vertical polarization antenna in nine radiation states according to an embodiment of the present disclosure.

FIG. 17 is a graph of S parameters (including S22 and S12) of the vertical polarization antenna in nine radiation states in the reconfigurable antenna of the present disclosure. FIG. 18 is a gain directivity pattern of the vertical polarization antenna in nine radiation states in the reconfigurable antenna of the present disclosure. As can be seen from FIG. 17 and FIG. 18, reflection coefficients of the horizontal polarization antenna designed in the present disclosure at 2.4 GHz to 2.825 GHz are all lower than-10 dB, and switching between the omnidirectional beam and the eight directional beams is realized. FIG. 19 is a schematic diagram of simulated main lobe gains of the vertical polarization antenna in nine radiation states in the reconfigurable antenna of the present disclosure. It can be seen from FIG. 19 that the main lobe gain of each beam tested at 2.44 GHz is greater than 3.1 dBi, with the peak gain being 3.8 dBi.

Figure 20:
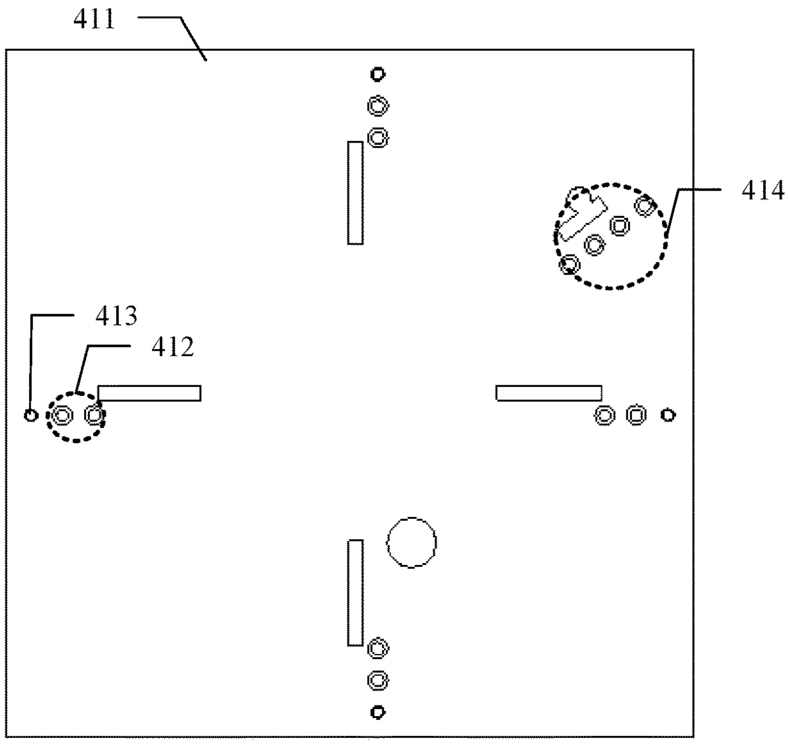
FIG. 20 is a schematic structural front view of an antenna board according to an embodiment of the present disclosure.
Figure 21:
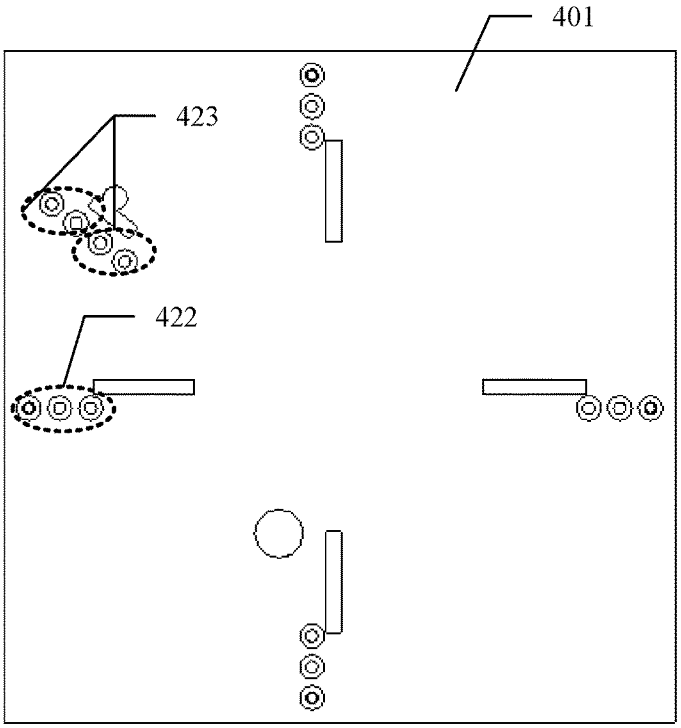
FIG. 21 is a schematic structural rear view of an antenna board according to an embodiment of the present disclosure.

In the embodiments of the present disclosure, the reconfigurable antenna further includes the antenna board. FIG. 20 is a schematic structural front view of the antenna board 4 in the reconfigurable antenna according to an embodiment of the present disclosure. FIG. 21 is a schematic structural rear view of the antenna board 4 in the reconfigurable antenna according to an embodiment of the present disclosure. The antenna board 4 includes a fifth dielectric plate 401 which is a 1 mm thick FR-4 dielectric plate having a size of 20 mm*20 mm. As shown in FIG. 20, a first conductor plate is laid on an entirety of a top layer of the fifth dielectric plate 401 except for a part of the top layer where holes and grooves are formed. The first conductor plate may be made of a copper foil 411. An outer conductor of the second coaxial cable is soldered to the copper foil 411. Referring to FIG. 20 to FIG. 21, the antenna board is provided with: four sets of symmetrical first pin holes 412, which are air through holes, each set of first pin holes including two air through holes; two pins, one of which is configured for connecting to the first bias line and the other of which is configured for connecting to the second bias line; and four second pin holes 413, which are metal through holes and are each configured for connecting to the first bias line. The air through holes and the metal through holes may have a diameter of 1 mm. Rectangular slots close to the first pin holes 412 and the second pin holes 413 are configured for insertion of the third dielectric plate and the fourth dielectric plate of the vertical polarization antenna. Third pin holes 414 are configured for respective insertion of the third pins 51 that connect the choke plate 5 to the antenna board 4 in FIG. 3. A rectangular groove close to the third pin holes is configured for insertion of the choke plate 5. It can also be understood that the materials, sizes, and shapes of the fifth dielectric plate and the first conductor plate and the sizes and positions of the through holes in the fifth dielectric plate and the first conductor plate are also merely examples, and are not to be construed as limiting the electronically controlled beam scanning dual-polarization reconfigurable antenna.

Figure 22:
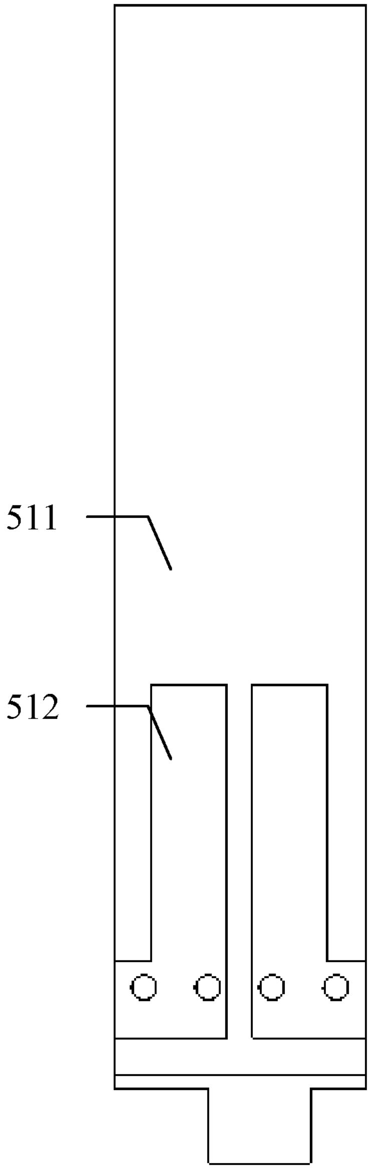
FIG. 22 is a schematic structural front view of a choke plate according to an embodiment of the present disclosure.
Figure 23:
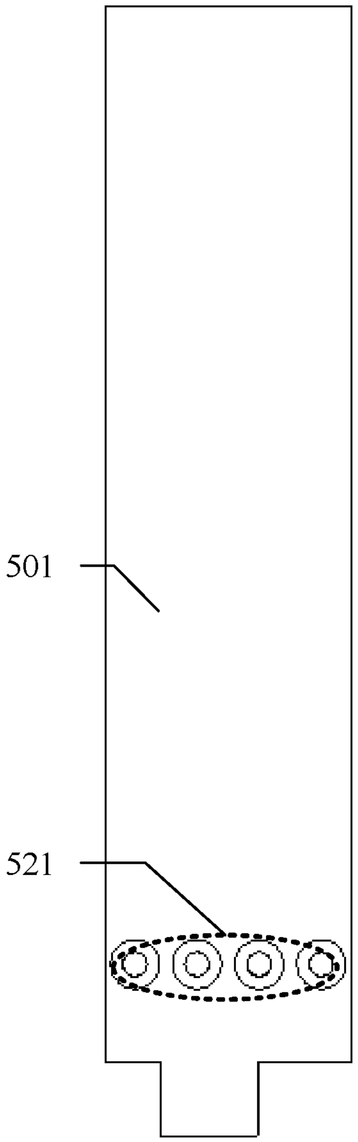
FIG. 23 is a schematic structural rear view of a choke plate according to an embodiment of the present disclosure.

In the embodiments of the present disclosure, the reconfigurable antenna further includes the choke plate to counteract a secondary radiation generated by a surface current of the first coaxial cable feeding the horizontal polarization antenna. FIG. 22 is a schematic structural front view of the choke plate in the reconfigurable antenna according to an embodiment of the present disclosure. FIG. 23 is a schematic structural rear view of the choke plate in the reconfigurable antenna according to an embodiment of the present disclosure. Referring to FIG. 22 to FIG. 23, the choke plate includes a sixth dielectric plate 501. The sixth dielectric plate is a 1 mm thick FR-4 dielectric plate. A second conductor plate is laid on a top layer of the sixth dielectric plate 501. The second conductor plate may be a copper foil 511. A pair of L-shaped slots 512 are etched on the copper foil 511. Pads 521 on a back side of the sixth dielectric plate 501 are configured for soldering of the third pins 51. It can also be understood that the materials, sizes, and shapes of the sixth dielectric plate and the second conductor plate and the shapes and positions of the slots 512 in the sixth dielectric plate and the second conductor plate are also merely examples, and are not to be construed as limiting the electronically controlled beam scanning dual-polarization reconfigurable antenna.

In the embodiments of the present disclosure, an electronically controlled beam scanning dual-polarization antenna operating at WLAN 2.4 GHz is realized, and a corresponding beam control method is provided. The electronically controlled beam scanning dual-polarization antenna realizes 360° directional beam scanning and switching between an omnidirectional beam and directional beams, features dual polarization, high gain, high anti-interference performance, and satisfactory stability, and is applicable to WLAN systems. The use of the electronically controlled beam scanning dual-polarization antenna in the embodiments of the present disclosure makes the information transmission of the WLAN system more reliable, further improves the throughput, reduces the power consumption, and enhances the environmental adaptability. The electronically controlled beam scanning dual-polarization antenna can transmit or receive a horizontally polarized wave and a vertically polarized wave simultaneously, thereby providing more reliable transmission and reception of information. Both the horizontal polarization antenna and the vertical polarization antenna in the embodiments of the present disclosure have the function of switching between an omnidirectional beam and directional beams, such that the radiation beam of the antenna can be flexibly changed according to the distribution of user density in the usage scenario and the environmental change, thereby improving the throughput, reducing the power consumption, and enhancing the environmental adaptability.

The electronically controlled beam scanning dual-polarization reconfigurable antenna in the embodiments of the present disclosure may be mounted on a 5 GHz wireless router to build a more reliable and flexible WLAN, thus providing a better enterprise-level wireless network scheme with a particular antenna selection algorithm in stations, airports, campuses, stadiums, office buildings, and other urban public places with high user density.

In an embodiment of the present disclosure, a method for controlling an electronically controlled beam scanning dual-polarization reconfigurable antenna is provided, which is applied to the electronically controlled beam scanning dual-polarization reconfigurable antenna provided in the embodiments of the present disclosure and includes the following steps:

- receiving a beam switching signal;
- controlling a bias voltage according to the beam switching signal;
- controlling on or off of the first diodes of the horizontal polarization antenna according to the bias voltage, where on or off of the first diodes leads to a change in distribution of a current in the first reflector of the horizontal polarization antenna, and the change in the distribution of the current causes the horizontal polarization antenna to switch between an omnidirectional beam and a plurality of directional beams; and/or
- controlling on or off of the second diodes of the vertical polarization antenna according to the bias voltage, where on or off of the second diodes leads to a change in an electrical length of the second reflector of the vertical polarization antenna, and the change in the electrical length of the second reflector causes the vertical polarization antenna to switch between an omnidirectional beam and a plurality of directional beams.

With the method for controlling an electronically controlled beam scanning dual-polarization reconfigurable antenna, the same technical effects as those achieved by the electronically controlled beam scanning dual-polarization reconfigurable antenna provided in the embodiments of the present disclosure can be achieved.

In an embodiment of the present disclosure, a router is provided. The router includes a reconfigurable antenna provided in the embodiments of the present disclosure. By using the router, the same technical effects as those achieved by the reconfigurable antenna provided in the embodiments of the present disclosure can be achieved.

In an embodiment of the present disclosure, a signal transceiving device is provided. The signal transceiving device includes a reconfigurable antenna provided in the embodiments of the present disclosure. By using the signal transceiving device, the same technical effects as those achieved by the reconfigurable antenna provided in the embodiments of the present disclosure can be achieved.

Beneficial effects of the present disclosure are as follows: The reconfigurable antenna in the embodiments of the present disclosure includes the horizontal polarization antenna, the vertical polarization antenna, and the antenna board. Switching between radiating an omnidirectional beam and radiating a plurality of horizontally polarized directional beams by the horizontal polarization antenna is controlled by controlling on or off of the plurality of first diodes on the horizontal polarization antenna. Switching between radiating an omnidirectional beam and radiating a plurality of vertically polarized directional beams is controlled by controlling on or off of the plurality of second diodes on the vertical polarization antenna. The antenna can be controlled to simultaneously generate horizontally polarized and vertically polarized electromagnetic waves, such that the reliability and flexibility of the antenna are improved. All the directional beams generated by the vertical polarization antenna and the horizontal polarization antenna can cover the circumferential direction and provide satisfactory electromagnetic wave coverage.

It should be noted that unless otherwise specified, when a feature is described as being "fixed" or "connected" to another feature, it may be directly fixed or connected to the another feature, or indirectly fixed or connected to the another feature. In addition, as used in the present disclosure, the orientation or positional relationships indicated by the terms such as "up", "down", "left", and "right" are based on orientation or positional relationships between the components of the present disclosure shown in the accompanying drawings. As used in the present disclosure, the singular forms "a", "an" and "the" are intended to include the plural forms as well, unless the context clearly dictates otherwise. In addition, unless otherwise defined, meanings of all technical and scientific terms used in this description are the same as those usually understood by those having ordinary skills in the art. Terms used in this description are merely intended to describe specific embodiments, but are not intended to limit the present disclosure. The term "and/or" used herein includes any combination of at least one of associated items listed.

It should be understood that although the terms such as "first", "second", "third" and the like may be used herein to describe various elements, these elements should not be limited by these terms. These terms are used only to distinguish elements of the same type from each other. For example, a first element may also be referred to as a second element, and similarly a second element may also be referred to as a first element, without departing from the scope of the present disclosure. The use of any and all examples or exemplary phrases ("for example", "e.g.", "such as", etc.) provided in this description is only used to better illustrate the embodiments of the present disclosure and is not intended to limit the scope of the present disclosure unless otherwise required.

Those having ordinary skills in the art can understand that all or some of the steps in the methods disclosed above and the functional modules/units in the system and the apparatus can be implemented as software, firmware, hardware, and appropriate combinations thereof. Some or all physical components may be implemented as software executed by a processor, such as a central processing unit, a digital signal processor, or a microprocessor, or as hardware, or as an integrated circuit, such as an application-specific integrated circuit.

The foregoing descriptions are merely several embodiments of the present disclosure, and are not intended to limit the present disclosure. As long as the technical effects of the present disclosure are achieved by the same means, any modification, equivalent replacement, or improvement made within the principle of the present disclosure shall fall within the protection scope of the present disclosure. Various modifications and variations can be made to the technical schemes and/or implementations of the present disclosure without departing from the protection scope of the present disclosure.

What is claimed is:

1. A reconfigurable antenna, comprising:

a horizontal polarization antenna comprising a patch structure arranged on an upper surface of a first dielectric plate and a first reflector arranged on a lower surface of the first dielectric plate, wherein a plurality of first slots are provided on the first reflector, the first reflector is electrically connected at each of the first slots to a first diode on the upper surface of the first dielectric plate, and the horizontal polarization antenna is controlled to radiate an omnidirectional beam or a plurality of directional beams by controlling on or off of the plurality of first diodes;

a vertical polarization antenna arranged below the horizontal polarization antenna and comprising a third dielectric plate and a fourth dielectric plate which are perpendicular to the first dielectric plate, wherein the third dielectric plate and the fourth dielectric plate are snap-fitted along a snap line perpendicular to the first dielectric plate to form a unity; a radiation patch is arranged on a back side of the third dielectric plate at the snap line, and at least one second reflector is arranged on each of two sides of the radiation patch; at least one second reflector is arranged on each of two sides of the snap line on a back side of the fourth dielectric plate; at least one second slot is provided on each of the second reflectors, and a second diode is connected across the second slot; and the vertical polarization antenna is controlled to radiate an omnidirectional beam or a plurality of directional beams by controlling on or off of the plurality of second diodes; and an antenna board, comprising a fifth dielectric plate, wherein the third dielectric plate and the fourth dielectric plate are inserted in the fifth dielectric plate, and a first conductor plate is arranged on an upper surface of the fifth dielectric plate.

2. The reconfigurable antenna of claim 1, wherein the patch structure comprises a plurality of Alford loop antennas arranged discretely, an annular segment is cut off from a tail of each of the Alford loop antennas, and a head of each of the Alford loop antennas is connected to a feed point through an impedance transformer.

3. The reconfigurable antenna of claim 2, wherein four first slots are provided on the first reflector, the second reflector is connected to four first diodes, and the four first diodes are adjacent in pairs; and in response to all the four first diodes being in an off state, the horizontal polarization antenna radiates the omnidirectional beam; or in response to two adjacent first diodes of the four first diodes being in the off state and the other two first diodes being in the on state, the horizontal polarization antenna radiates a directional beam.

4. The reconfigurable antenna of claim 2, wherein the horizontal polarization antenna further comprises a second dielectric plate arranged on a lower surface of the first reflector, a ring-shaped metal patch is arranged on a lower surface of the second dielectric plate, and a plurality of third slots are etched along a radius of the ring-shaped metal patch.

5. The reconfigurable antenna of claim 1, wherein four first slots are provided on the first reflector, the second reflector is connected to four first diodes, and the four first diodes are adjacent in pairs; and in response to all the four first diodes being in an off state, the horizontal polarization antenna radiates the omnidirectional beam; or in response to two adjacent first diodes of the four first diodes being in the off state and the other two first diodes being in the on state, the horizontal polarization antenna radiates a directional beam.

6. The reconfigurable antenna of claim 1, wherein the reconfigurable antenna further comprises a plurality of sets of first bias lines arranged on the first dielectric plate, the third dielectric plate, and the fourth dielectric plate, each set of first bias lines is configured for applying a bias voltage to the plurality of first diodes, and the bias voltage is configured for controlling on or off of the plurality of first diodes.

7. The reconfigurable antenna of claim 6, wherein the reconfigurable antenna further comprises a plurality of sets of second bias lines arranged on the third dielectric plate or the fourth dielectric plate, the second bias lines are configured for applying a bias voltage to the plurality of second diodes, and the bias voltage is configured for controlling on or off of the plurality of second diodes.

8. The reconfigurable antenna of claim 7, wherein the first bias lines or the second bias lines comprise two or more short bias lines spaced apart, and a choke inductance element is connected across a spacing between two short bias lines.

9. The reconfigurable antenna of claim 7, wherein a first capacitor element is further connected between the first bias line and the first diode; and/or a second capacitor element is connected between the second bias line and the second diode.

10. The reconfigurable antenna of claim 1, wherein the horizontal polarization antenna further comprises a second dielectric plate arranged on a lower surface of the first reflector, a ring-shaped metal patch is arranged on a lower surface of the second dielectric plate, and a plurality of third slots are etched along a radius of the ring-shaped metal patch.

11. The reconfigurable antenna of claim 1, wherein two second reflectors are arranged on the back side of the third dielectric plate, two second reflectors are arranged on the back side of the fourth dielectric plate, one second slot is provided on each of the second reflectors, and four second diodes connected across the four second slots are adjacent in pairs; and in response to all the four second diodes being in the off state, the vertical polarization antenna radiates the omnidirectional beam; or in response to two adjacent first diodes of the four first diodes being in the off state and the other two first diodes being in the on state, the vertical polarization antenna radiates a directional beam; or in response to three of the four first diodes being in the off state and the other one first diode being in the on state, the vertical polarization antenna radiates a directional beam.

12. The reconfigurable antenna of claim 1, wherein a feeding patch is arranged at a center line of a front surface of the third dielectric plate to coupling-feed the radiation patch.

13. The reconfigurable antenna of claim 1, wherein the radiation patch is a monopole patch, and a fourth slot is provided on the monopole patch.

14. The reconfigurable antenna of claim 1, wherein the reconfigurable antenna further comprises a choke plate inserted in the antenna board to counteract a secondary radiation of a surface current of a first coaxial cable, and the first coaxial cable is configured for feeding the horizontal polarization antenna.

15. The reconfigurable antenna of claim 14, wherein the choke plate comprises a sixth dielectric plate and a second conductor plate arranged on a top layer of the sixth dielectric plate, and a pair of fifth slots are provided on the second conductor plate.

16. A method for controlling a reconfigurable antenna, wherein the reconfigurable antenna is the reconfigurable antenna of claim 1, the method comprising:

receiving a beam switching signal;

controlling a bias voltage according to the beam switching signal;

controlling on or off of the first diodes according to the bias voltage, wherein the horizontal polarization antenna is controlled by on or off of the first diodes to switch between radiating an omnidirectional beam and radiating a plurality of directional beams; and controlling on or off of the second diodes according to the bias voltage, wherein the vertical polarization antenna is controlled by on or off of the second diodes to switch between radiating an omnidirectional beam and radiating a plurality of directional beams.

17. A router, comprising a reconfigurable antenna, the reconfigurable antenna comprising:

a horizontal polarization antenna comprising a patch structure arranged on an upper surface of a first dielectric plate and a first reflector arranged on a lower surface of the first dielectric plate, wherein a plurality of first slots are provided on the first reflector, the first reflector is electrically connected at each of the first slots to a first diode on the upper surface of the first dielectric plate, and the horizontal polarization antenna is controlled to radiate an omnidirectional beam or a plurality of directional beams by controlling on or off of the plurality of first diodes;

a vertical polarization antenna arranged below the horizontal polarization antenna and comprising a third dielectric plate and a fourth dielectric plate which are perpendicular to the first dielectric plate, wherein the third dielectric plate and the fourth dielectric plate are snap-fitted along a snap line perpendicular to the first dielectric plate to form a unity; a radiation patch is arranged on a back side of the third dielectric plate at the snap line, and at least one second reflector is arranged on each of two sides of the radiation patch; at least one second reflector is arranged on each of two sides of the snap line on a back side of the fourth dielectric plate; at least one second slot is provided on each of the second reflectors, and a second diode is connected across the second slot; and the vertical polarization antenna is controlled to radiate an omnidirectional beam or a plurality of directional beams by controlling on or off of the plurality of second diodes; and an antenna board, comprising a fifth dielectric plate, wherein the third dielectric plate and the fourth dielectric plate are inserted in the fifth dielectric plate, and a first conductor plate is arranged on an upper surface of the fifth dielectric plate.

18. A signal transceiving device, comprising a reconfigurable antenna, the reconfigurable antenna comprising:

a horizontal polarization antenna comprising a patch structure arranged on an upper surface of a first dielectric plate and a first reflector arranged on a lower surface of the first dielectric plate, wherein a plurality of first slots are provided on the first reflector, the first reflector is electrically connected at each of the first slots to a first diode on the upper surface of the first dielectric plate, and the horizontal polarization antenna is controlled to radiate an omnidirectional beam or a plurality of directional beams by controlling on or off of the plurality of first diodes;

a vertical polarization antenna arranged below the horizontal polarization antenna and comprising a third dielectric plate and a fourth dielectric plate which are perpendicular to the first dielectric plate, wherein the third dielectric plate and the fourth dielectric plate are snap-fitted along a snap line perpendicular to the first dielectric plate to form a unity; a radiation patch is arranged on a back side of the third dielectric plate at the snap line, and at least one second reflector is arranged on each of two sides of the radiation patch; at least one second reflector is arranged on each of two sides of the snap line on a back side of the fourth dielectric plate; at least one second slot is provided on each of the second reflectors, and a second diode is connected across the second slot; and the vertical polarization antenna is controlled to radiate an omnidirectional beam or a plurality of directional beams by controlling on or off of the plurality of second diodes; and an antenna board, comprising a fifth dielectric plate, wherein the third dielectric plate and the fourth dielectric plate are inserted in the fifth dielectric plate, and a first conductor plate is arranged on an upper surface of the fifth dielectric plate.

* * * * *